(12) United States Patent
Iida et al.

(10) Patent No.: US 10,007,382 B2
(45) Date of Patent: Jun. 26, 2018

(54) INFORMATION PROCESSING APPARATUS AND INFORMATION PROCESSING METHOD

(71) Applicant: SONY CORPORATION, Tokyo (JP)

(72) Inventors: Fumihiko Iida, Kanagawa (JP); Hideo Tanaka, Kanagawa (JP); Kazuyuki Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 14/911,200

(22) PCT Filed: Jul. 9, 2014

(86) PCT No.: PCT/JP2014/003641
§ 371 (c)(1),
(2) Date: Feb. 9, 2016

(87) PCT Pub. No.: WO2015/025458
PCT Pub. Date: Feb. 26, 2015

(65) Prior Publication Data
US 2016/0179288 A1     Jun. 23, 2016

(30) Foreign Application Priority Data

Aug. 19, 2013  (JP) .................................. 2013-169664

(51) Int. Cl.
*G06F 3/041*     (2006.01)
*G06F 3/0346*    (2013.01)
(Continued)

(52) U.S. Cl.
CPC .......... *G06F 3/0418* (2013.01); *G06F 3/0346* (2013.01); *G06F 3/0412* (2013.01);
(Continued)

(58) Field of Classification Search
CPC .. G06F 3/0418; G06F 3/04883; G06F 3/0416; G06F 2203/04104; G06F 3/0412;
(Continued)

(56) References Cited

U.S. PATENT DOCUMENTS

2011/0285645 A1*  11/2011  Cho ...................... G06F 3/0416
                                                      345/173
2012/0038571 A1*  2/2012   Susani .................. G06F 3/0416
                                                      345/173
(Continued)

FOREIGN PATENT DOCUMENTS

EP        2077490 A2    7/2009
WO     2013/061658 A1    5/2013

OTHER PUBLICATIONS

Extended European Search Report of EP Patent Application No. 14837232.9, dated Mar. 1, 2017, 08 pages.

*Primary Examiner* — Md Saiful A Siddiqui
(74) *Attorney, Agent, or Firm* — Chip Law Group

(57) ABSTRACT

This information processing apparatus includes: a display panel; a sensor panel that is superimposed on the display panel and detects coordinates designated by a user; and a control unit that sets, with a region detectable by the sensor panel being a first region, a second region in at least a part of the first region and invalidates the coordinates detected in the second region.

10 Claims, 22 Drawing Sheets

(51) Int. Cl.
*G06F 3/0488* (2013.01)
*G06F 3/0481* (2013.01)

(52) U.S. Cl.
CPC ........ *G06F 3/0488* (2013.01); *G06F 3/04817* (2013.01); *G06F 3/04886* (2013.01)

(58) Field of Classification Search
CPC .................. G06F 3/044; G06F 3/03545; G06F 2203/04106; G06F 3/0354; G06F 3/041
See application file for complete search history.

(56) References Cited

U.S. PATENT DOCUMENTS

| | | |
|---|---|---|
| 2012/0287076 A1 | 11/2012 | Dao et al. |
| 2013/0009915 A1 | 1/2013 | Hering |
| 2014/0253480 A1* | 9/2014 | Arigaya ................ G06F 3/1446 345/173 |
| 2015/0116232 A1 | 4/2015 | Hayakawa |
| 2015/0301713 A1* | 10/2015 | Suda .................... G06F 3/0487 715/762 |

* cited by examiner

INFORMATION PROCESSING APPARATUS AND INFORMATION PROCESSING METHOD

CROSS-REFERENCE TO RELATED APPLICATION

The present application is a National Stage of PCT/JP2014/003641, filed Jul. 9, 2014, and claims priority to Japanese Priority Patent Application 2013-169664 filed on Aug. 19, 2013, the entire contents of which are incorporated herein by reference.

TECHNICAL FIELD

The present technology relates to an information processing apparatus with a touch panel using operation inputs and to an information processing method.

BACKGROUND ART

The use of hand-held type information processing apparatuses including a tablet PC that is a slate personal computer (PC), a smart phone, and the like has become widespread in recent years. Typically, the apparatus of this type is not equipped with a mouse and a keyboard unlike a PC and receives operation inputs from users through a touch screen disposed on a display screen.

For realizing flexible input operations through the touch screen, a touch panel that is capable of, even if a user touches a plurality of positions on the touch screen at the same time, detecting the touch positions has been developed (e.g., see Patent Document 1).

In an input system using such a touch panel, input operations correspond to operation explanations on the display screen. Therefore, there is an advantage in that it becomes easy for the user to intuitively understand what kind of operation should be made and the operation becomes easy.

Patent Document 1: Japanese Patent Application Laid-open No. 2012-178093

SUMMARY OF INVENTION

Problem to be Solved by the Invention

As described above, the use of hand-held type information processing apparatuses with the touch panel through which input operations can be performed in a simple and intuitive manner is widespread. However, false detection may occur when the user accidentally touches the touch panel, for example. Thus, the user interface of the information processing apparatus with the touch panel has points to be improved.

In view of the above-mentioned circumstances, it is an object of the present technology to provide as information processing apparatus with a touch panel whose user interface has improved operability and an information processing method.

Means for Solving the Problem

In order to accomplish the above-mentioned object, an information processing apparatus according to an embodiment of the present technology includes: a display panel; a sensor panel that is superimposed on the display panel and detects coordinates designated by a user; and a control unit that sets, with a region detectable by the sensor panel being a first region, a second region in at least a part of the first region and invalidates the coordinates detected in the second region.

In order to accomplish the above-mentioned object, in the information processing apparatus according to the present technology, the control unit may analyze information on a screen displayed on the display panel and set the second region if the analysis result satisfies a predetermined condition.

In order to accomplish the above-mentioned object, in the information processing apparatus according to the present technology, the control unit may provide the second region in an outer peripheral portion of the first region.

In order to accomplish the above-mentioned object in the information processing apparatus according to the present technology, a first sensor that detects an attitude of holding the information processing apparatus may be further provided. The control unit may set the second region based on the detected attitude.

In order to accomplish the above-mentioned object, in the information processing apparatus according to the present technology, the display panel may have different vertical and horizontal lengths, and the control unit may set, when the display panel is held in a vertically long attitude, the second region on both sides in a direction orthogonal to a longitudinal direction of the first region, and may set, when the display panel is held in a horizontally long attitude, the second region on both sides in the longitudinal direction of the first region and a lower side of the first region in this attitude.

In order to accomplish the above-mentioned object, in the information processing apparatus according to the present technology, the control unit may display, when the second region is set, information of the screen in a region inside the second region.

In order to accomplish the above-mentioned object, in the information processing apparatus according to the present technology, a second sensor that detects a finger position of the user holding the information processing apparatus may be further provided. The control unit may set the second region based on the detected finger position.

In order to accomplish the above-mentioned object, in the information processing apparatus according to the present technology, the sensor panel may be constituted of a region corresponding to the display panel, in which coordinates designated by a user are detected, and a region that functions a second sensor that detects a finger position of a user holding the information processing apparatus.

In order to accomplish the above-mentioned object, in the information processing apparatus according to the present technology, the control unit may determine a third region which is displayed in at least a past of the first region, to which predetermined processing is assigned, and which is selectable by a user, and set a region of the first region, which excludes the third region, as the second region.

In order to accomplish the above-mentioned object, in the information processing apparatus according to the present technology, the third region may be an icon.

In order to accomplish the above-mentioned object, in the information processing apparatus according to the present technology, the third region may be an input section of a graphical user interface.

In order to accomplish the above-mentioned object, an information processing method according to the present technology includes: by a control unit setting, with a region detectable by a sensor panel that is superimposed on a display panel and detects coordinates designated by a user being a first region, a second region in at least a part of the first region; and invalidating the coordinates detected in the second region.

Effects of the Invention

As described above, according to the present technology, it is possible to improve the operability of the user interface in the information processing apparatus with the touch panel. Note that the effects described here are not necessarily limited and may be any of effects described in the present disclosure.

MODE FOR CARRYING OUT THE INVENTION

Hereinafter, embodiments according to the present technology will be described with reference to the drawings. Note that the following descriptions will be made assuming cases where a touch screen is touched by a finger(s). Cases where a gloved finger(s) is used and where a stylus pen is used are handled in basically the same manner because they are merely slightly different in detection sensitivity on the touch screen.

[Configuration of Information Processing Apparatus]

Figure 1:
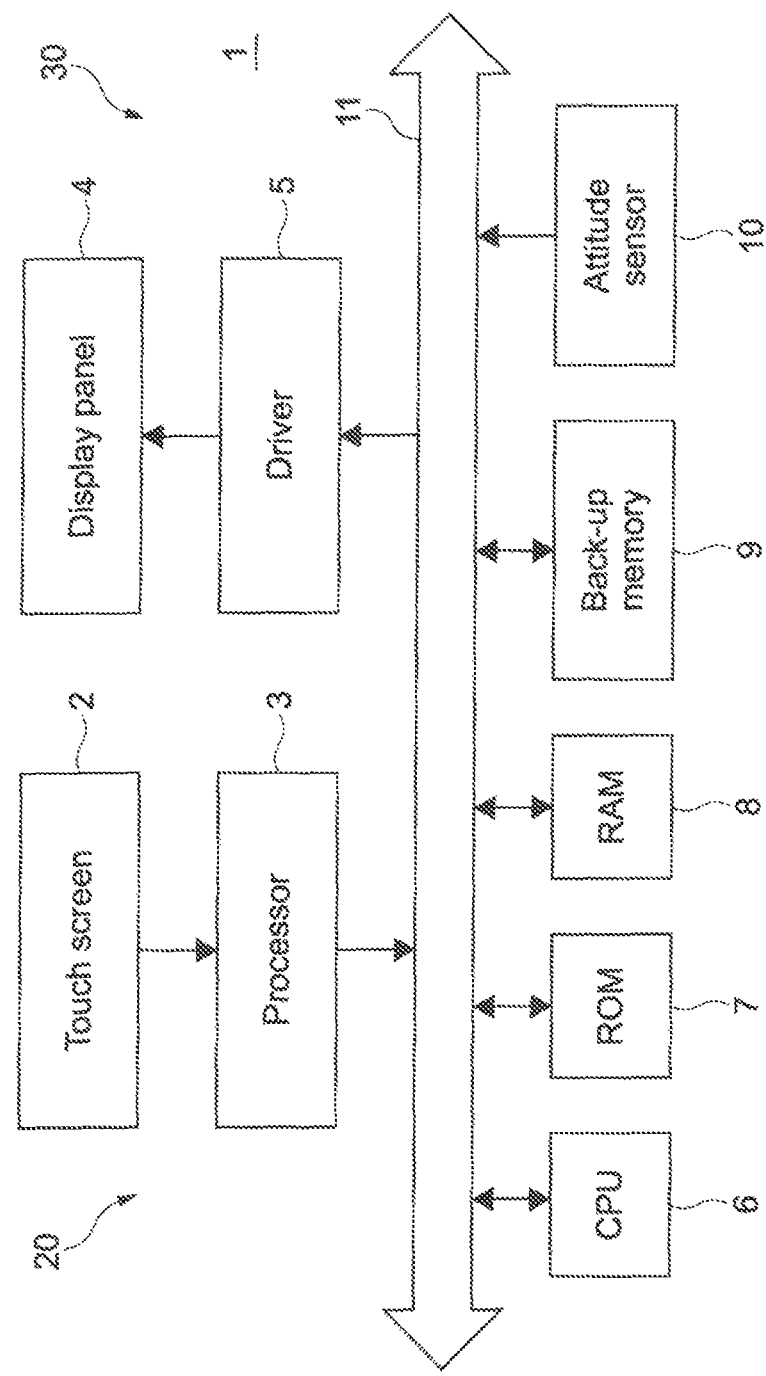
FIG. 1 A configuration diagram of an information processing apparatus with a touch panel according to the present technology.

First, an example of a configuration of an information processing apparatus with a touch panel according to the present technology will be described. FIG. 1 is a configuration diagram of the information processing apparatus with the touch panel according to the present technology.

An information processing apparatus 1 includes a touch screen (sensor panel) 2, a processor 3, a display panel 4, a driver 5, a CPU (Central Processing Unit) (control unit) 6 that performs arithmetic control, a ROM (Read Only Memory) 7, a RAM (Random Access Memory) 8 serving as a work memory (working area) for the CPU 6, a back-up memory 9, an attitude sensor 10 (first sensor), and a bus 11 that connects them to one another.

The touch screen 2 and the processor 3 constitute an input unit 20. The display panel 4 and the driver 5 constitute a display unit 30. The CPU 6, the ROM 7, and the RAM 8 constitute a micro computer.

The touch screen (sensor panel) 2 detects a touch input made by a user as coordinates. Examples of the detection method include a capacitive type, a pressure-sensitive type, and an optical type. In the present technology, any types of touch screens may be used. A region (first region) of the touch screen 2, in which an input of the user can be detected, is typically set based on the size of the screen of the display panel 4.

The display panel 4 is driven and controlled by the driver 5 to display figures and characters on the display screen. As long as it can be superimposed on the touch screen 2 for the use, any display panel, for example, a liquid-crystal panel an organic EL (Electro Luminescence) panel, and electronic paper may be used as the display panel. The driver 5 processes, based on an input operation or the like designated by the user via the touch screen 2, characters, figures, images, or the like generated by the CPU 6 and displays them on the display screen of the display panel 4.

The ROM 7 stores programs for executing various types of processing. An attitude sensor 10 is an acceleration sensor, a tilt sensor, a gyro sensor, or the like. The attitude sensor 10 detects the attitude of the information processing apparatus 1 when the user holds the information processing apparatus 1 and detects that the information processing apparatus 1 is being carried. For storing user data and program data for a long period, a magnetic disk such as an HDD (Hard Disk Drive), a semiconductor memory such as a flash memory, and the like are applied to the back-up memory 9.

The CPU 6 deploys a program of a plurality of programs stored in the ROM 7, the back-up memory 9, and the like, which corresponds to an instruction or the like provided from the touch screen 2, into the RAM 7 and appropriately controls the driver 5 according to the deployed program.

The present technology is to ignore (not to detect) coordinates of coordinates detected by the touch screen 2 as positions touched by the user, which are in a particular range. The range in which the coordinates should be ignored is determined by the CPU 6 executing a particular program. This particular program may be realized as firmware of the information processing apparatus 1, may be realized as a part of an OS (Operating System), may be realized as middleware that lies between the OS and application software, may be realized as particular application software, or may be realized by a combination thereof.

Note that, for the sake of convenience, the following descriptions will be made assuming that the CPU 6 executes this particular program and ignores the detected coordinates in the particular range. More specifically, ignoring the detected coordinates in the particular range means that the CPU 6 determines an input enabled region (third region) of a GUI (Graphical User Interface) displayed on the display unit 30 by the OS or the application software, which is used for input, and the CPU 6 excludes the coordinates detected on the touch screen 2 in a region (second region) other than this input enabled region from a touch position detection algorithm.

In other words, the information processing apparatus 1 of the present technology includes the display panel 4, the touch screen 2 that is superimposed on the display panel 4 and detects coordinates designated by the user, and the CPU 6 sets, with a region detectable by the touch screen 2 being the first region, the second region in at least a part of the first region and invalidates the coordinates detected in the second region.

In other words, it can be considered that the information processing apparatus 1 according to the present technology is roughly constituted of three layers, a lower-order layer, a middle-order layer, and an upper-order layer. The lower-order layer is a hardware layer that is constituted of the touch screen 2, the processor 3, and the like. The upper-order layer is a software layer that performs particular processing using coordinates input by user's touch. The middle-order layer is a software layer that transfers or does not transfer coordinates input by user's touch, that have bean transmitted from the lower-order layer, to the upper-order layer depending on the situation of the information processing apparatus 1. Note that the middle-order layer and the upper-order layer may be configured by hardware.

Here, the situation of the information processing apparatus 1 is, for example, the type of software activated on the information processing apparatus 1, the state of the GUI displayed on the display unit 30 by that software (e.g., which region a touchable button or the like is drawn in), or the state in which the information processing apparatus 1 is held by the user (holding by both hands, holding by one hand, carrying, etc.).

The example of the configuration of the information processing apparatus with the touch panel according to the present technology has been described above.

[Processing Flow (Outline) in Present Technology]

Figure 2:
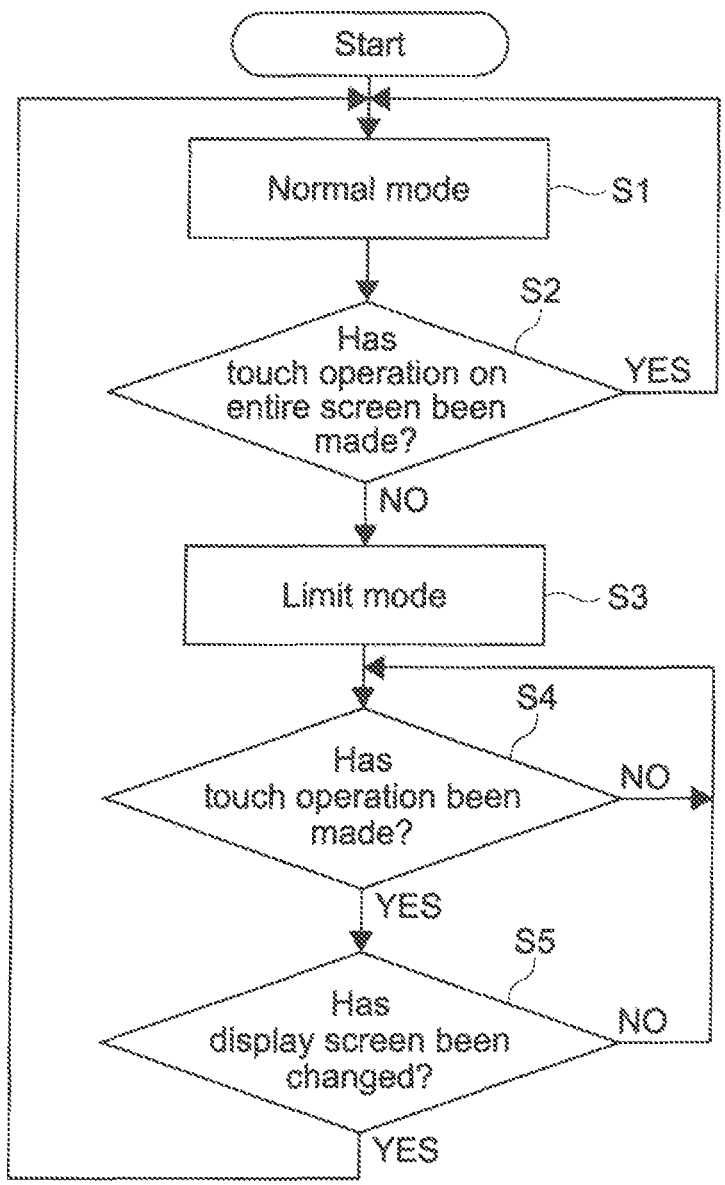
FIG. 2 A flowchart showing the outline of a processing flow for ignoring detected coordinates in a particular range in an information processing apparatus 1 using the present technology.

Next, in the information processing apparatus 1 using the present technology, the outline of a processing flow for ignoring the detected coordinates in the particular range will be described. FIG. 2 is a flowchart indicating the outline of a processing flow for ignoring the detected coordinates in the particular range in the information processing apparatus 1 using the present technology.

When the information processing apparatus 1 is activated, the CPU 6 first sets the information processing apparatus 1 to a normal mode. (Step S1)

On the normal mode, when the user's touch input is made, even if the touch position is anywhere in an entire region (first region) of the touch screen 2, software that requires that input is notified of a coordinate position thereof. That is, an undetectable region (second region) is not provided on the touch screen 2. In other words, the entire surface of the touch screen 2 is active and inputs can be made (touch detection is possible) in the entire region of the display panel 4.

Note that, as an example in which it is necessary to receive a touch input on the normal mode, there are swiping from the outer peripheral portion of the display unit 30, a full-screen display state of an image, and the like.

Next, the CPU 6 determines whether or not a GUI that requires a touch operation in the entire region of the touch screen 1 is displayed. (Step S2)

If the GUI that requires the touch operation in the entire region is displayed (YES in Step S2), the CPU 6 returns to Step S1 and continues processing on the normal mode.

If the GUI that requires the touch operation in the entire region is not displayed (NO in Step S2), the CPU 6 sets the information processing apparatus 1 to a limit mode. (Step S3)

On the limit mode, the above-mentioned situation of the information processing apparatus 1 is detected by the CPU 6 and the CPU 6 sets the particular range for ignoring the detected coordinates (second region) depending on the situation. That is, on the limit mode, the middle-order layer analyzes, as described above, a range in which the coordinates by the touch input are required by the upper-order layer. Then, only if the coordinates within the range (third region) in which the coordinates by the touch input are required are input, these coordinates are transmitted to the upper-order layer. If the coordinates outside the range in which the coordinates by the touch input are required are input this input is ignored (invalidated) and the transmission to the upper-order layer is not performed. Note that situations of the information processing apparatus 1 and particular ranges set depending on those situations will be described later.

Next, the CPU 6 determines whether or not the user's touch operation has been made in the range in which the coordinates by the touch input are required by the upper-order layer. (Step S4)

If the touch operation has not been performed (NO in Step S4), the CPU 6 continues processing of Step S4 (waits for touch input).

If the touch operation has been made (YES in Step S4), then, the CPU 6 determines whether or not the screen display of the display unit 30 has been changed. (Step S5)

If the screen display has not been changed (NO in Step S5), the CPU 6 returns to the processing of Step S4.

If the screen display has been changed (YES in Step S5), the CPU 6 returns to Step S1 and continues the processing. The processing returns to Step S1 because there is a possibility that the screen subsequently displayed due to the change of the screen display may be a screen that needs to receive arbitrary coordinates on the entire screen as an input.

Hereinabove, in the information processing apparatus 1 using the present technology, the outline of a processing flow for ignoring the detected coordinates in the particular range has been described.

[Setting Examples of Particular Range for Ignoring Detected Coordinates]

Next setting examples of a particular range for ignoring detected coordinates, which is set by the CPU 6, will be described.

Example without Present Technology

Figure 3:
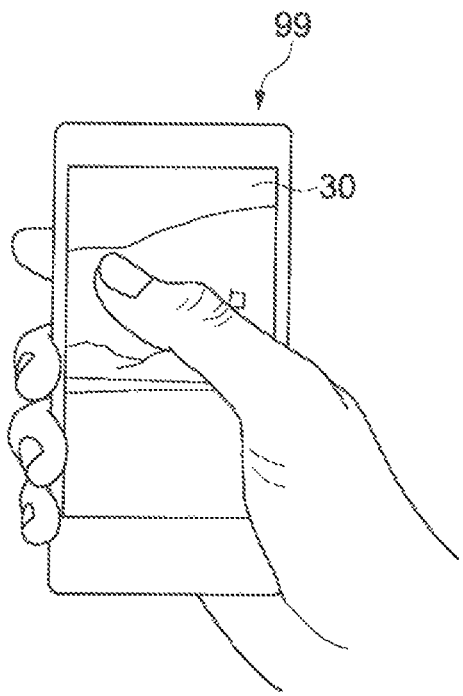
FIG. 3 A diagram that is an example in which a smart phone is used as an information processing apparatus 99 and shows a state in which the user is holding it by the right hand.

First, an example of false detection in an information processing apparatus 99 without the present technology will be described. FIG. 3 is an example using the smart phone as the information processing apparatus 99 and is a diagram showing a state in which the user holds it by the right hand.

Figure 4:
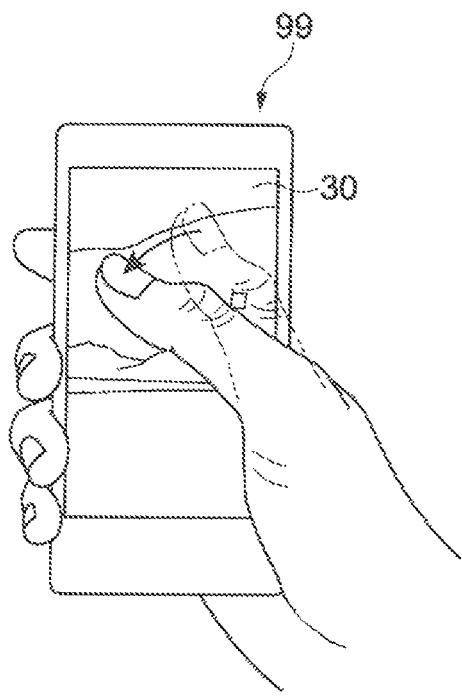
FIG. 4 A diagram showing a state in which the user is performing a touch input with respect to the information processing apparatus 99 by the thumb of the right hand.

From the state shown in this figure, the user performs a touch input by moving the thumb of the right hand, for example. FIG. 4 is a diagram showing a state in which the user is performing the touch input with respect to the information processing apparatus 99 by the thumb of the right hand.

Figure 5:
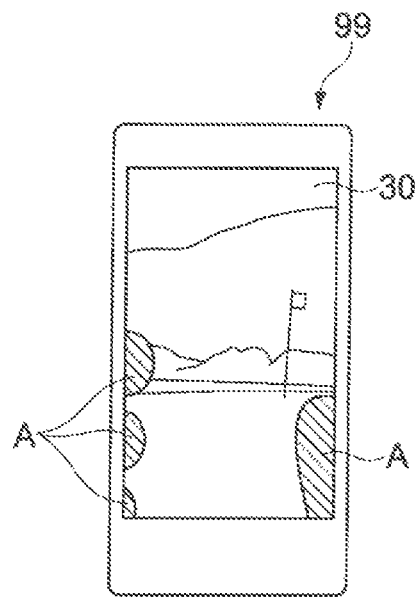
FIG. 5 A diagram showing a region A in which there is a possibility that false detection may occur by the tips of the index finger, the middle finger, the ring finger, and the little linger that are used for holding the information processing apparatus 99 or the base of the thumb that is performing a touch input touching the touch screen.

When the user performs such a touch input, there is a possibility that false detection may occur by a site other than the thumb, that is, the tips of the index finger, the middle finger, the ring finger, and the little finger that are used for holding the information processing apparatus 99 or the base of the thumb that is performing the touch input touching the touch screen. FIG. 5 is a diagram showing the region A in which there is a possibility that false detection may occur by the tips of the index finger, the middle finger, the ring finger, and the little finger that are used for holding the information processing apparatus 99 or the base of the thumb that is performing the touch input touching the touch screen.

Hereinabove, the example of the false detection in the information processing apparatus 99 without the present technology has been described.

(First Limit Mode)

Figure 6:
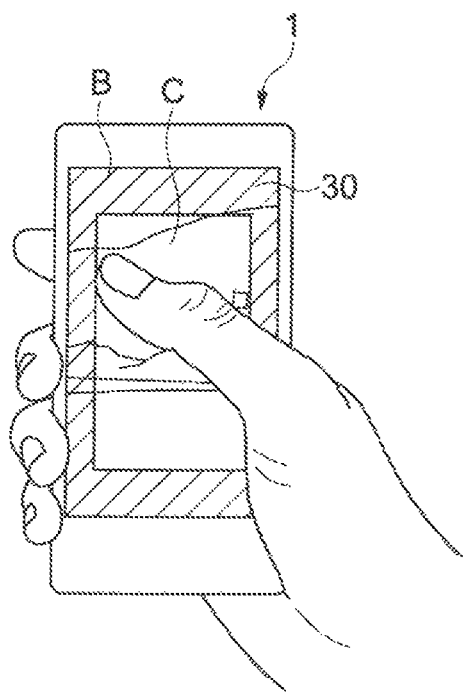
FIG. 6 A diagram showing one of specific examples in which the particular range for ignoring the detected coordinates is set in the information processing apparatus 1 using the present technology.

Next, in order to reduce the false detection rate, in the information processing apparatus 1 using the present technology, one of the specific examples in which the particular range for ignoring the detected coordinates is set will be described. FIG. 6 is a diagram showing one of the specific examples in which the particular range for ignoring the detected coordinates is set in the information processing apparatus 1 using the present technology. Note that, also in this figure, the smart phone is exemplified as the information processing apparatus 1 and a state in which the user holds the start phone by the right hand and operates it by the thumb of the right hand is assumed.

In the present technology, as in this figure, the outer peripheral portion of the screen of the display unit 30 including the region A in which there is a possibility that false detection may occur is set as an input-ignoring region B (second region). At the same time, a region inside of the input-ignoring region B set in the screen of the display unit 30 is set as an input enabled region C.

Regarding the width of the input-ignoring region B, a default value may be used therefor, it may be set by the user, or it may be changed depending on the size of the information processing apparatus 1 to which the present technology is applied. For example, in the case where a smart phone having a size that can be gripped by one hand is used as the information processing apparatus 1, the hand of the user becomes relatively large and the portions touching the touch screen 2 increases. Therefore, it is conceivable to increase the width of the outer peripheral portion for providing the input-ignoring region B.

In contrast, for example, in the case where a large tablet PC having a screen size of 10 inches is used as the information processing apparatus 1, the hand of the user becomes relatively small and the portions touching the touch screen 2 decreases. Therefore, it is conceivable to reduce the width of the input-ignoring region B.

By setting the input-ignoring region B, even if a site other than the finger used for the touch input intended by the user touches this region B, the possibility that the contact may be erroneously detected can be lowered.

Note that, in the following descriptions, the limit mode on which the input-ignoring region B is provided in the outer peripheral portion of the screen of the display unit 30, which has been described above, will be referred to as a first limit mode.

Hereinabove, one of the specific examples in which the particular range for ignoring the detected coordinates is set in the information processing apparatus 1 using the present technology has been described.

Modified Example 1

Here, a modified example of the specific example on the first limit mode will be described. Although, in the specific example shown in FIG. 6, the region on the screen is divided into the region B and the region C, the size of the image displayed on the screen of the display unit 30 is not changed. Therefore, for example, in the case where buttons of the GUI displayed on the screen enter the input-ignoring region B, it is impossible to perform touch operations with respect to the buttons.

Figure 7:
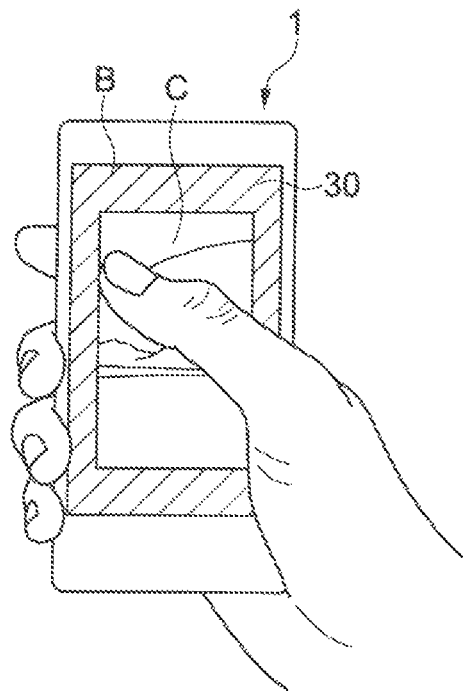
FIG. 7 A diagram showing a state in which, when the region on the screen is divided into a region B and a region C, an image displayed on the screen of a display unit 30 is reduced in size to fit onto an input enabled region C.

In contrast, in this modified example, when the region on the screen is divided into the region B and the region C, the image displayed on the screen of the display unit 30 is reduced in size to fit onto the input enabled region C. FIG. 7 is a diagram showing a state in which, when the region on the screen is divided into the region B and the region C, the image displayed on the screen of the display unit 30 is reduced in size to fit onto the input enabled region C. With this configuration, for example, the buttons of the GUI displayed on the screen become smaller correspondingly to the reduction in size but all of them are within the input enabled region C. It is thus possible to prevent the touch operations from becoming impossible.

Hereinabove, the modified example on the first limit mode has been described.

(Second Limit Mode)

Figure 8:
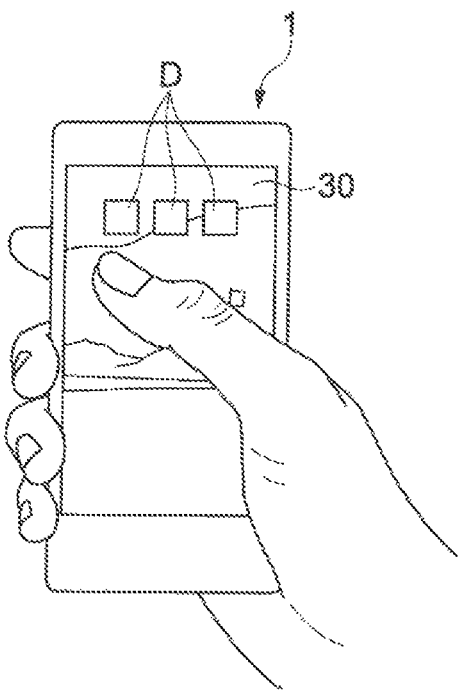
FIG. 8 A diagram showing another one of the specific examples in which the particular range for ignoring the detected coordinates is set.

Next, as in the above-mentioned example, another one of the specific examples in which the particular range for ignoring the detected coordinates is set will be described. FIG. 8 is a diagram showing another one of the specific examples in which the particular range for ignoring the detected coordinates is set. As shown in the figure, in this example, three selection targets D, specifically, icons or three buttons (input section) of the GUI are shown on the screen of the display unit 30.

In the present technology, an input enabled region E (third region) is provided in these selection targets D and peripheries thereof. A region of a region in which touch detection by the touch screen 2 can be performed, which excludes the input enabled region E, is set as an input-ignoring region F (second region).

In order to provide the input enabled region E, it is necessary to accurately recognize the coordinate positions of the selection targets D. A generally-used method only needs to be applied to the recognition method.

For example, a source code of software for displaying the selection targets D on the screen may be analyzed in advance, a binary code that is an execution file of the software may be analyzed in real time, or the recognition may be performed at a time when an API for the GUI for displaying the selection targets D is called as a part of the GUI.

As another method of recognizing the selection targets D, for example, there is a method in which, for each of application software modules, a range in which the selection targets D can be displayed during execution of the software module is determined in advance. For example, for application software for an electronic calculator, the positions at which the selection targets D are displayed are not changed from the start to the end of the software. Therefore, the positions of the respective buttons of the electronic calculator that are the selection targets D may be determined in advance. During execution of an electronic calculator application, a region including these buttons may be set as the input enabled region.

Figure 9:
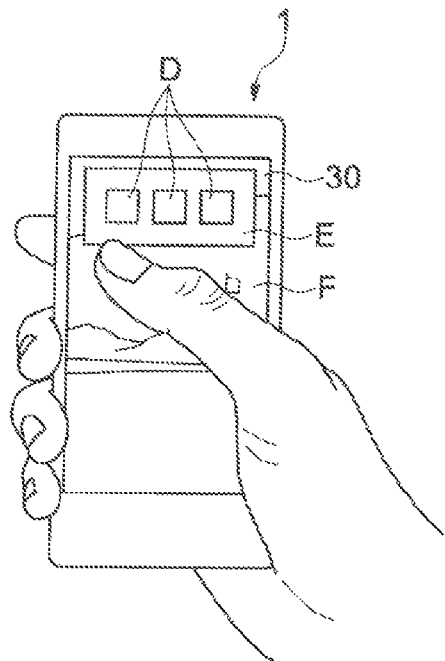
FIG. 9 A diagram showing an example in which an input enabled region E and an input-ignoring region F are provided on the screen of the display unit 30 of the information processing apparatus 1.

FIG. 9 is a diagram showing an example in which an input enabled region E and an input-ignoring region F are provided on the screen of the display unit 30 of the information processing apparatus 1.

By setting the input-ignoring region F, even if a site other than the finger used for the touch input intended by the user touches this region F, the possibility that the contact may be erroneously detected can be lowered.

Note that, in the following descriptions, the limit mode on which only the selection targets D and the peripheries thereof are set as the input enabled region E, which has been described above, will be referred to as a second limit mode.

Although the description has been made above assuming that the first limit mode and the second limit mode are independent, these limit modes can also be used at the same time.

The other specific example in which the particular range for ignoring the detected coordinates is set in the information processing apparatus 1 using the present technology has been described above.

Other Effects

With the present technology, the following effects can also be obtained in addition to the above-mentioned effects.

For example, it is possible to reduce the false detection rate in the peripheral portion of the screen of the display unit 30 of the information processing apparatus 1, and hence it is possible to widen the screen of the display unit 30 as close as possible to the outer frame of the information processing apparatus 1, that is, to reduce the width of the frame portion of the information processing apparatus.

Furthermore, it is possible to reduce the false detection rate, and hence it is possible to improve the detection accuracy of touch inputs that should be detected.

Furthermore, erroneous operations of the information processing apparatus 1 due to the false detection are reduced, and hence it is possible to reduce the number of times of recovery processing necessary for the user to recover from the results of the erroneous operations when the erroneous operations occur. Therefore, it is possible to save the time necessary to execute the recovery processing, and to reduce the power necessary to execute the recovery processing and achieve power saving.

Hereinabove, the other effects in the case where the present technology is used have been described.

[Setting Examples of Particular Range Depending on Situations of Information Processing Apparatus 1]

Next, situations where the false detection occurs in the information processing apparatus 99 to which the present technology is not applied and setting examples of the particular range depending on the situations in the information processing apparatus 1 using the present technology will be individually described. Here, as examples of the information processing apparatus 1, a large tablet PC having a screen size of about 10 inches, a small tablet PC having a screen size of about 7 inches, and a smart phone are used. Furthermore, the descriptions will be made in cases where these apparatuses are held by the user by both hands and where they are held by the user by one hand.

(Case where Large Tablet is Held by Both Hands)

Figure 10:
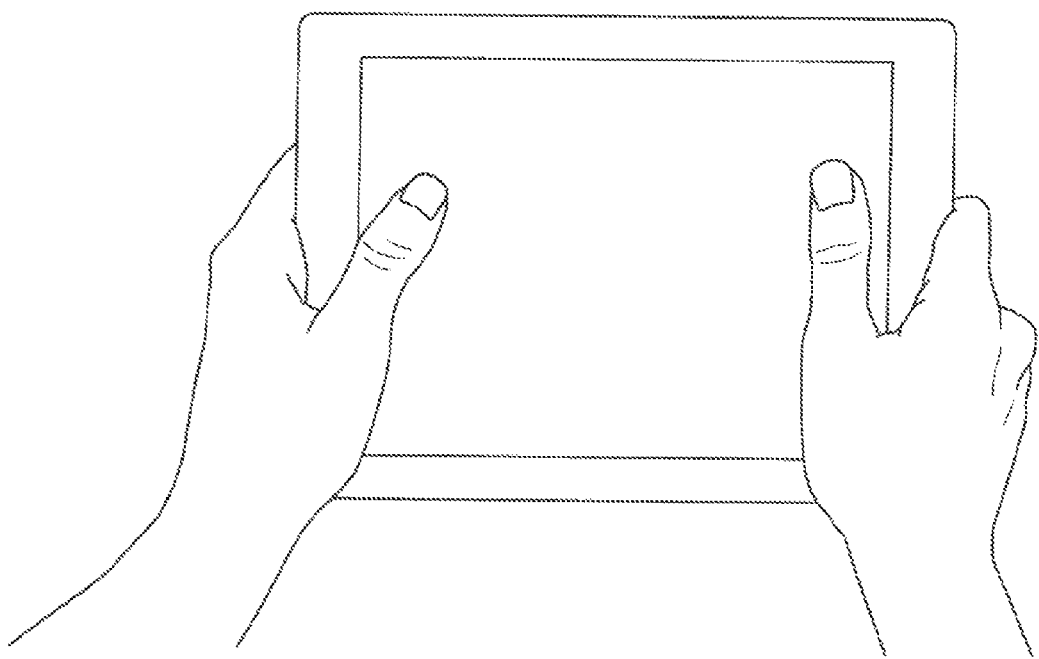
FIG. 10 A diagram showing a state in which a large tablet PC is held by both hands.

First, a situation that occurs in the case where the large tablet PC is held by both hands will be considered. FIG. 10 is diagram showing a state in which the large tablet PC is held by both hands.

In the case of the figure, the situation of the information processing apparatus 99 is a situation where the user is holding the information processing apparatus 99 or performing a screen operation. The touch operation that should be detected in this situation is selection of the selection targets D or scrolling of the screen by the tips of the thumbs. The false detection occurs by the base of the thumb touching the touch screen.

Figure 11:
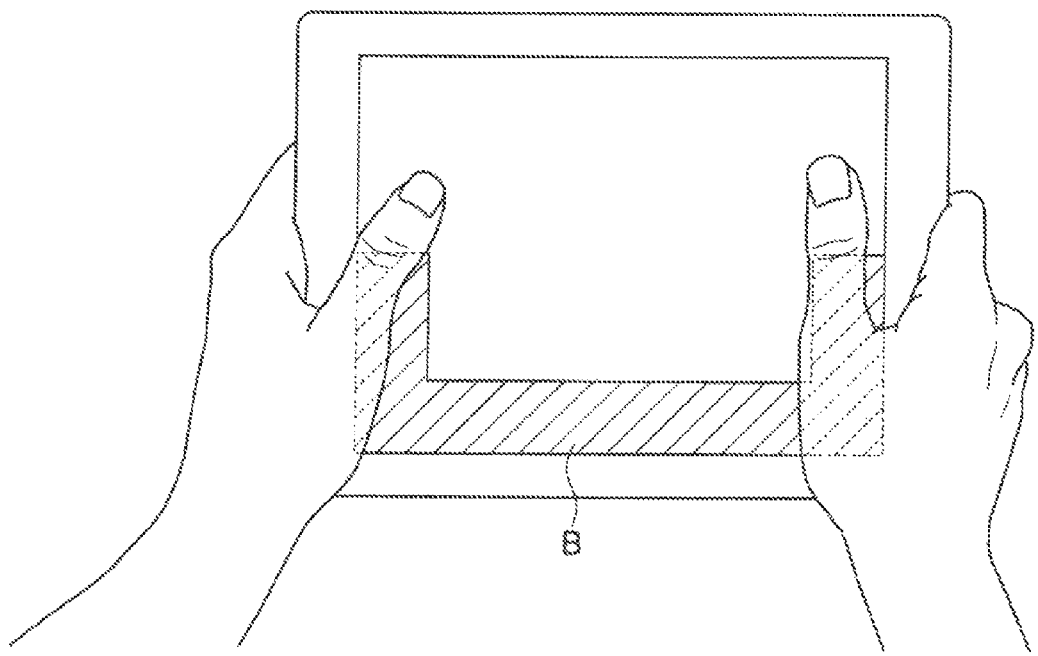
FIG. 11 A diagram showing an example in which an input-ignoring region B is provided in the large tablet PC.

In such a case, in the information processing apparatus 1, the false detection rate can be reduced by using the first limit mode or the second limit mode. FIG. 11 is an example in which the CPU 6 considers a signal from the attitude sensor 10 (detects that the information processing apparatus is held in a horizontally long state) and provides, in using the first limit mode, an input-ignoring region B not in the entire outer peripheral portion of the touch screen 2 but only in the lower half of the outer peripheral portion.

(Case where Large Tablet is Held by One Hand)

Figure 12:
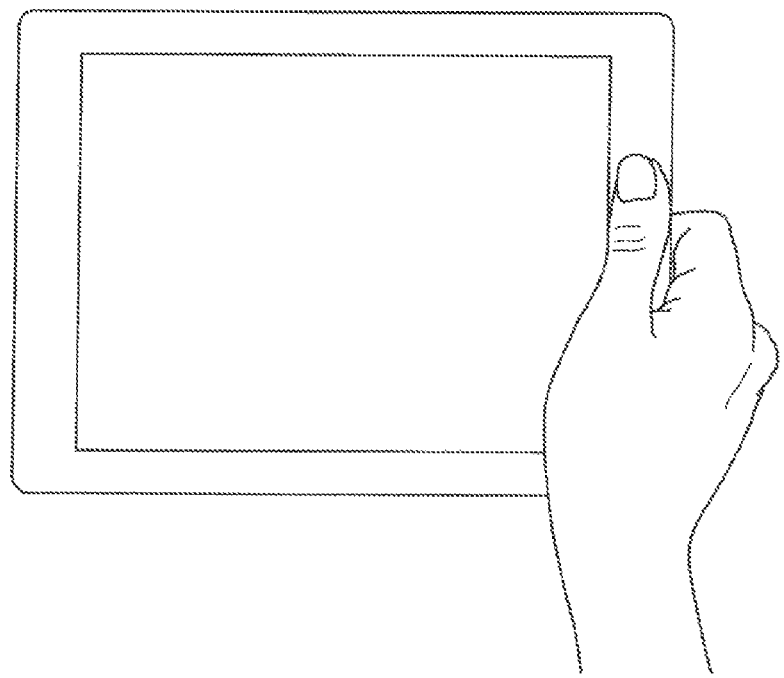
FIG. 12 A diagram showing a state in which the large tablet PC is held by one hand.

Next, a situation that occurs in the case where the large tablet PC is held by one hand will be considered. FIG. 12 is a diagram showing a state in which the large tablet PC is held by one hand.

In the case of the figure, the situation of the information processing apparatus 99 is a situation where the user is holding the information processing apparatus 99 or performing a screen operation. The touch operation that should be detected in this situation is selection of the selection targets D or scrolling of the screen by the tips of the thumbs. The false detection occurs by the base of the thumb touching the touch screen.

Figure 13:
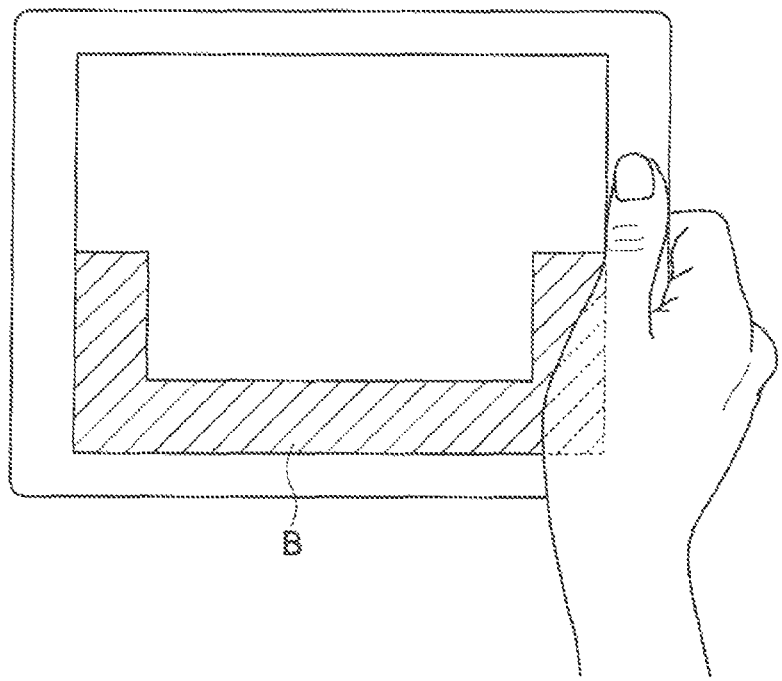
FIG. 13 A diagram showing an example in which an input-ignoring region B is provided is the large tablet PC.

In such a case, in the information processing apparatus 1, the false detection rate can be reduced by using the first limit mode or the second limit mode. FIG. 13 is an example in which the CPU 6 considers a signal from the attitude sensor 10 (detects that the information processing apparatus is held in a horizontally long state) and provides, in using the first limit mode, an input-ignoring region B not in the entire outer peripheral portion of the touch screen 2 but only in the lower half of the outer peripheral portion.

(Case where Large Tablet is Carried)

Figure 14:
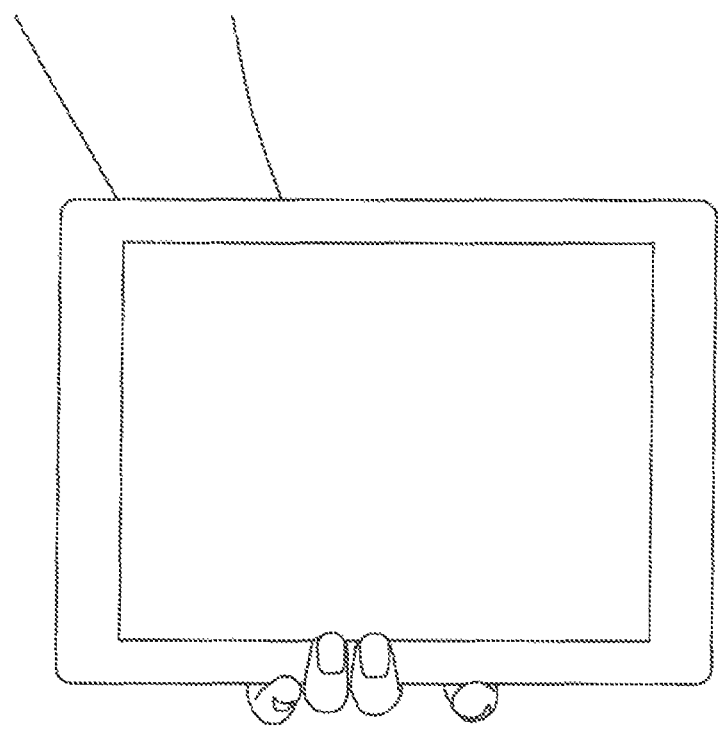
FIG. 14 A diagram showing a state in which the large tablet PC is carried.

Next, a situation that occurs in the case where the large tablet PC is carried will be considered. FIG. 14 is a diagram showing a state in which the large tablet PC is carried.

In the case of the figure, the situation of the information processing apparatus 99 is a situation where the user holds the information processing apparatus 99 by one hand from below. The touch operation that should be detected in this situation is not present. The false detection occurs by the tips of the fingers, which are holding the information processing apparatus 99, touching the touch screen.

Figure 15:
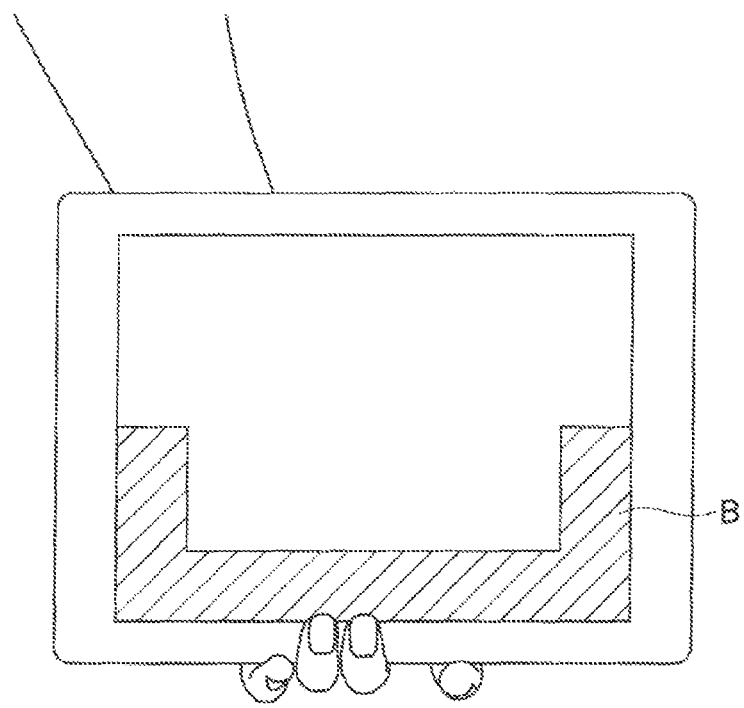
FIG. 15 A diagram showing an example in which an input-ignoring region B is provided in the large tablet PC.

In such a case, in the information processing apparatus 1, the false detection rate can be reduced by using the first limit mode. FIG. 15 is an example in which the CPU 6 considers a signal from the attitude sensor 10 (detects that the information processing apparatus is held in a horizontally long state) and provides, in using the first limit mode, an input-ignoring region B not in the entire outer peripheral portion of the touch screen 2 but only in the lower half of the outer peripheral portion.

Hereinabove, the various types of false detection in the case where the user holds the large tablet and the countermeasure patterns therefor have been shown together. In conclusion, it is grasped that the tablet is held in the horizontally long state by using the signal from the attitude sensor 10, and hence it is possible to limit, in using the first limit mode, the range in which the input-ignoring region B is provided not to the entire outer peripheral portion of the touch screen 2 but only to the lower half of the outer peripheral portion.

(Case where Small Tablet is Held by Both Hands)

Figure 16:
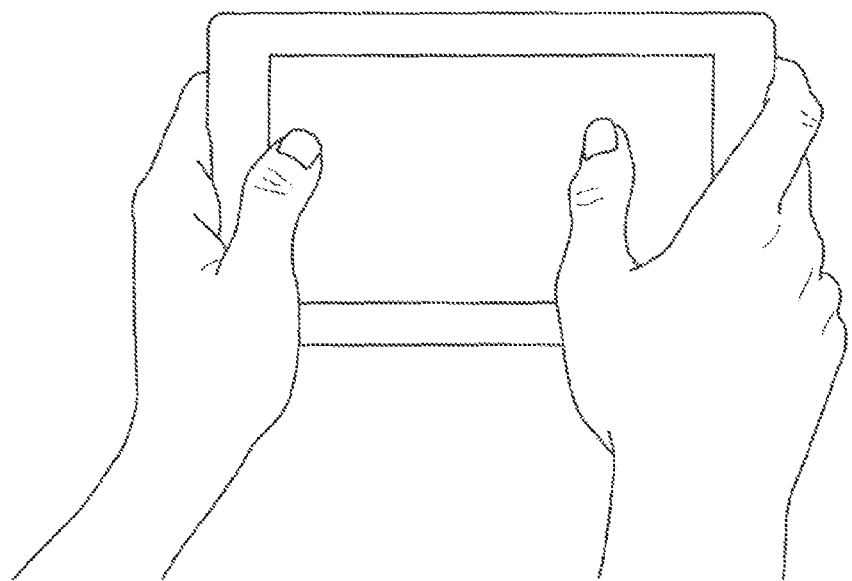
FIG. 16 A diagram showing a state in which a small tablet PC is held by both hands.

Next, a situation that occurs in the case where the small tablet PC is held by both hands will be considered. FIG. 16 is a diagram showing a state in which the small tablet PC is held by both hands.

In the case of the figure, the situation of the information processing apparatus 99 is a situation where the user is holding the information processing apparatus 99 or performing a screen operation. The touch operation that should be detected in this situation is selection of the selection targets D or scrolling of the screen by the tips of the thumbs. The false detection occurs by the base of the thumb touching the touch screen.

Figure 17:
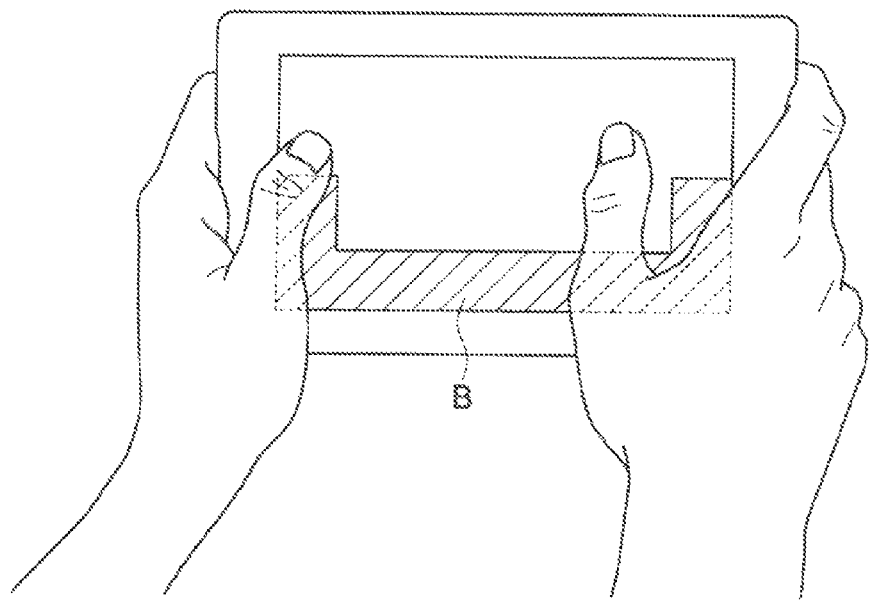
FIG. 17 A diagram showing an example in which an input-ignoring region B is provided in the small tablet PC.

In such a case, in the information processing apparatus 1, the false detection rate can be reduced by using the first limit mode. FIG. 17 is an example in which the CPU 6 considers a signal from the attitude sensor 10 (detects that the information processing apparatus is held in a horizontally long state) and provides, in using the first limit mode, an input-ignoring region B not in the entire outer peripheral portion of the touch screen 2 but only in the lower half of the outer peripheral portion.

(Case where Small Tablet is Held by One Hand (Part I))

Figure 18:
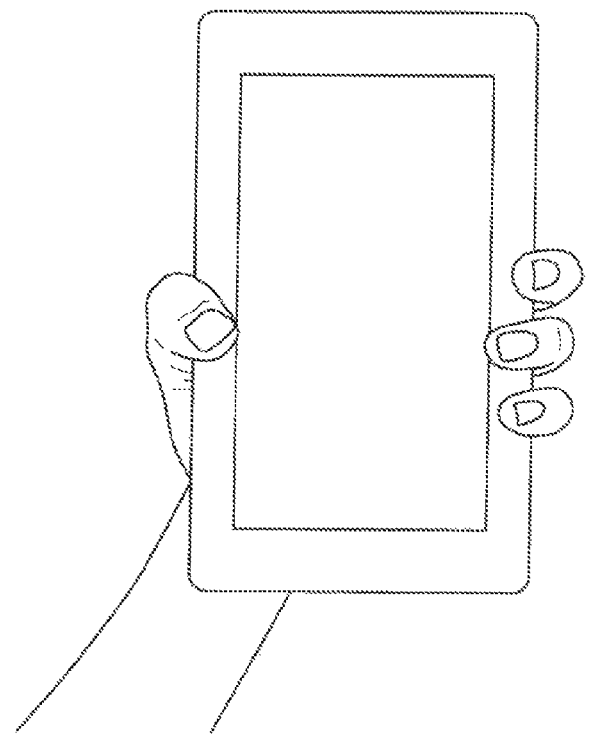
FIG. 18 A diagram showing a state in which the small tablet PC is held by one hand.

Next, a situation that occurs in the case where the small tablet PC is held by one hand (Part I) will be considered. FIG. 18 is a diagram showing a state in which the small tablet PC is held by one hand. Note that, in this case, the user holds the small tablet PC from behind.

In the case of the figure, the situation of the information processing apparatus 99 is a situation where the user is holding the information processing apparatus 99, performing a screen operation, or carrying it. The touch operation that should be detected in this situation is selection of the selection targets D by the tips of the thumbs or scrolling of the screen in the case of the screen operation or scrolling. The touch operation that should be detected in this situation is not particularly present in the case of carrying. The false detection occurs by the tips of the fingers, which are holding the information processing apparatus 99, touching the touch screen.

Figure 19:
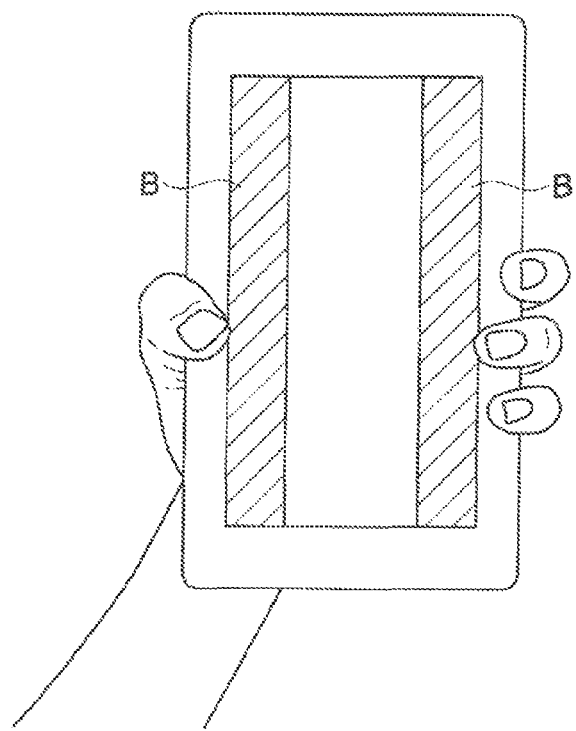
FIG. 19 A diagram showing an example in which input-ignoring regions B are provided in the small tablet PC.

In such a case, in the information processing apparatus 1, the false detection rate can be reduced by using the first limit mode or the second limit mode. FIG. 19 is an example in which the CPU 6 considers a signal from the attitude sensor 10 (detects that the information processing apparatus is held in a vertically long state) and provides, in using the first limit mode, input-ignoring regions B not in the entire outer peripheral portion of the touch screen 2 but only in left and right portions of the outer peripheral portion.

(Case where Small Tablet is Held by One Hand (Part II))

Figure 20:
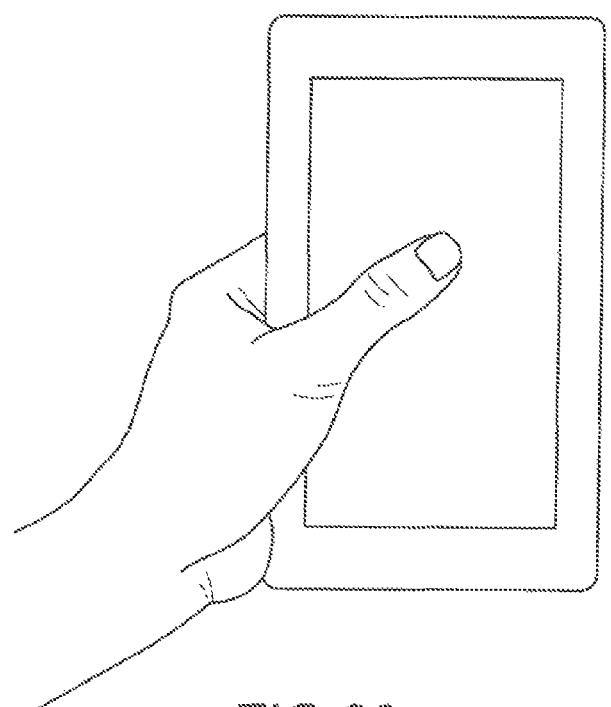
FIG. 20 A diagram showing a state in which the small tablet PC is held by one hand.

Next, a situation that occurs in the case where the small tablet PC is held by one hand (Part II) will be considered. FIG. 20 is a diagram showing a state in which the small tablet PC is held by one hand. Note that, in this case, the user holds the left side of the small tablet PC as viewed from the front.

In the case of the figure, the situation of the information processing apparatus 99 is a situation where the user is holding the information processing apparatus 99, performing a screen operation, or carrying it. The touch operation that should be detected in this situation is selection of the selection targets D by the tips of the thumbs in the case of the screen operation or scrolling. The touch operation that should be detected in this situation is not particularly present in the case of carrying. The false detection occurs by the base of the thumb, which is holding the information processing apparatus 99, touching the touch screen.

Figure 21:
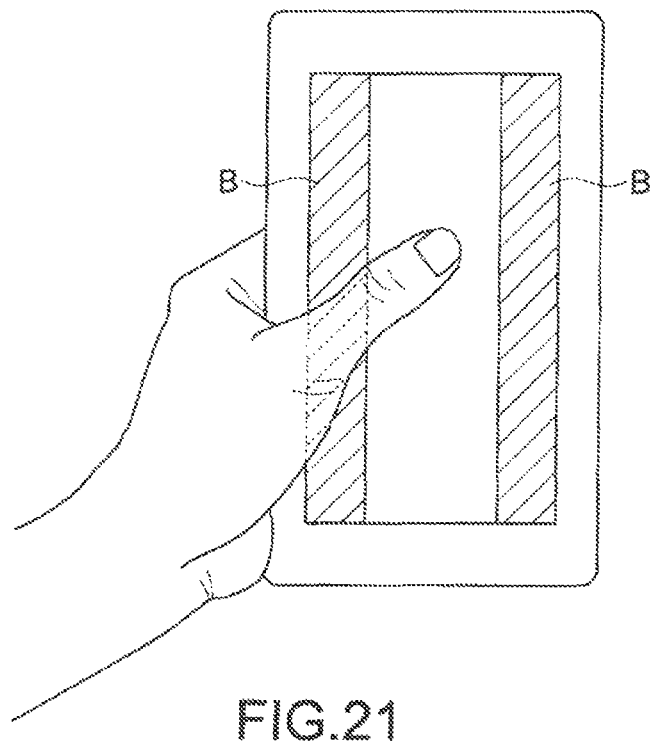
FIG. 21 A diagram showing an example in which input-ignoring regions B are provided in the small tablet PC.

In such a case, in the information processing apparatus 1, the false detection rate can be reduced by using the first limit mode. FIG. 21 is an example in which the CPU 6 considers a signal from the attitude sensor 10 (detects that the information processing apparatus is held in a vertically long state) and provides, in using the first limit mode, an input-ignoring region B not in the entire outer peripheral portion of the touch screen 2 but only in left and right portions of the outer peripheral portion.

Hereinabove, the various types of false detection in the case where the user holds the small tablet and the patterns of the countermeasures thereof have been shown together. In conclusion, when it is grasped that the tablet is held in the horizontally long state by using the signal from the attitude sensor 10, it is possible to limit, in using the first limit mode, the range in which the input-ignoring region B is provided not to the entire outer peripheral portion of the touch screen 2 but only to the lower half of the outer peripheral portion. Furthermore, when the tablet is held in the vertically long state, it is possible to limit, in using the first limit mode, the range in which the input-ignoring region B is provided only to the left and right portions of the outer peripheral portion of the touch screen 2.

(Case where Smart Phone is Held by Both Hands)

Figure 22:
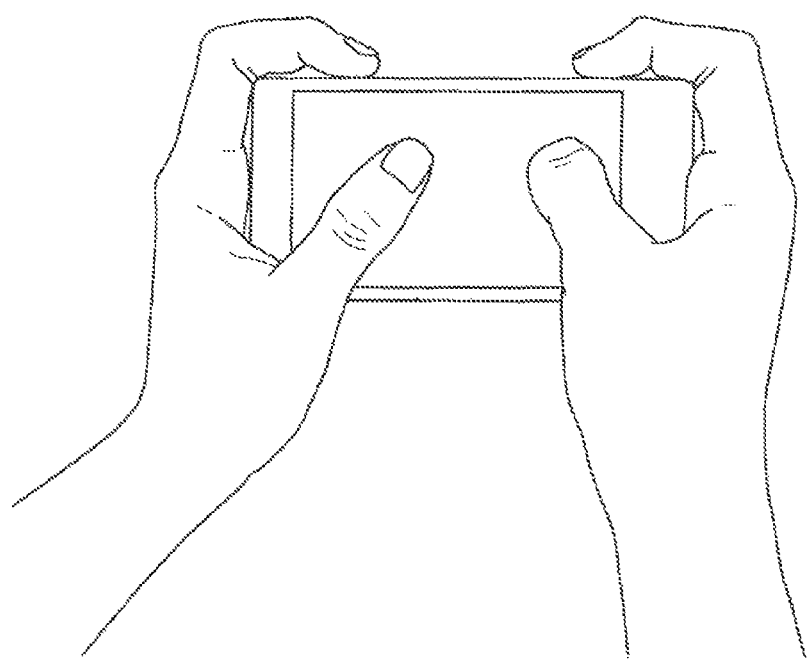
FIG. 22 A diagram showing a state in which a smart phone is held by both hands.

Next, a situation that occurs in the case where the smart phone is held by both hands will be considered. FIG. 22 is a diagram showing a state in which the smart phone is held by both hands.

In the case of the figure, the situation of the information processing apparatus 99 is a situation where the user is holding the information processing apparatus 99 or performing a screen operation. The touch operation that should be detected in this situation is selection of the selection targets D by the tips of the thumbs. The false detection occurs by the base of the thumb touching the touch screen.

Figure 23:
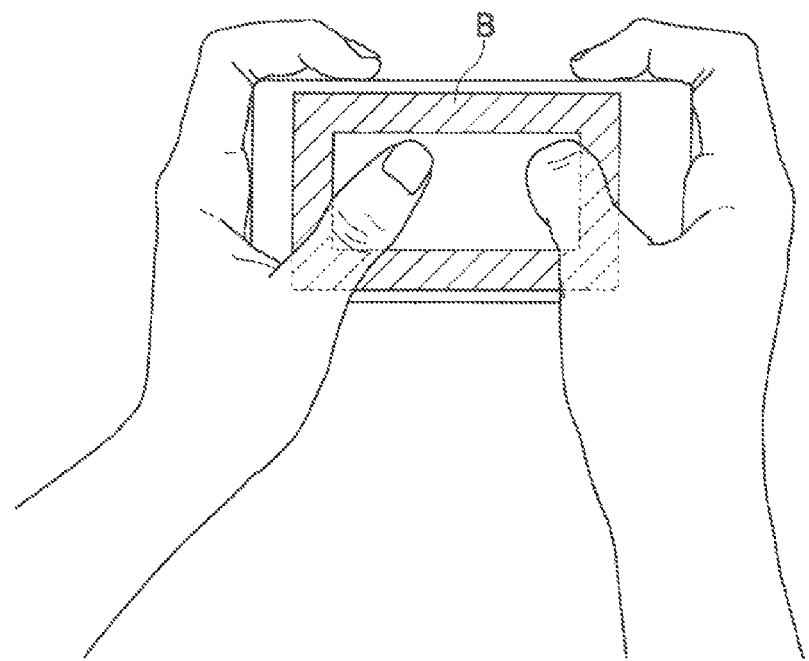
FIG. 23 A diagram showing an example in which an input-ignoring region B is provided in the smart phone.

In such a case, in the information processing apparatus 1, the false detection rate can be reduced by using the first limit mode. FIG. 23 is an example is which the CPU 6 provides, in using the first limit mode, an input-ignoring region B in the entire outer peripheral portion of the touch screen 2. Note that, in the case where the user holds the smart phone, it is favorable that an input-ignoring region B be provided in the entire outer peripheral portion of the touch screen 2 irrespective of whether the holding is performed by both hands or by one hand and irrespective of the holding attitude of the smart phone.

(Case where Smart Phone is Held by One Hand (Part I))

Figure 24:
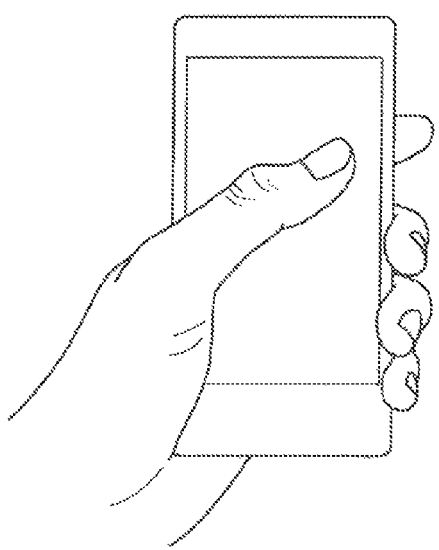
FIG. 24 A diagram showing a state in which the smart phone is held by one hand.

Next, a situation that occurs in the case where the smart phone is held by one hand (Part I) will be considered. FIG. 24 is a diagram showing a state in which the smart phone is held by one hand.

In the case of the figure, the situation of the information processing apparatus 99 is a situation where the user is holding the information processing apparatus 99, performing a screen operation, or carrying it. The touch operation that should be detected in this situation is selection of the selection targets D by the tips of the thumbs in the case of the screen operation. The touch operation that should be detected in this situation is not particularly present in the case of holding or carrying. The false detection occurs by the base of the thumb or the tips of the index to little fingers touching the touch screen.

Figure 25:
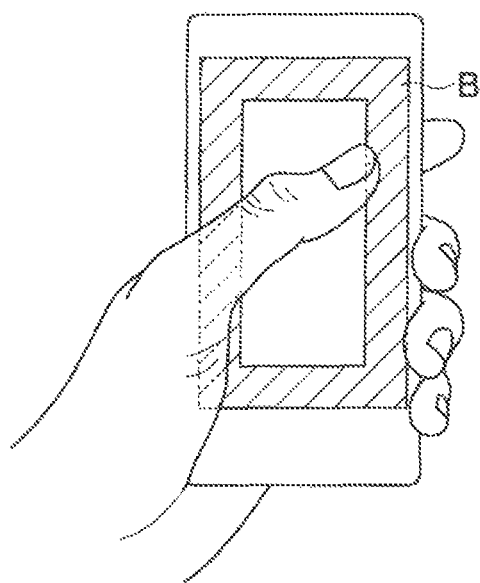
FIG. 25 A diagram showing an example in which an input-ignoring region B is provided in the smart phone.

In such a case, in the information processing apparatus 1, the false detection rate can be reduced by using the first limit mode. FIG. 25 is an example in which the CPU 6 provides, in using the first limit mode, an input-ignoring region B in the entire outer peripheral portion of the touch screen 2.

(Case where Smart Phone is Held by One Hand (Part II))

Figure 26:
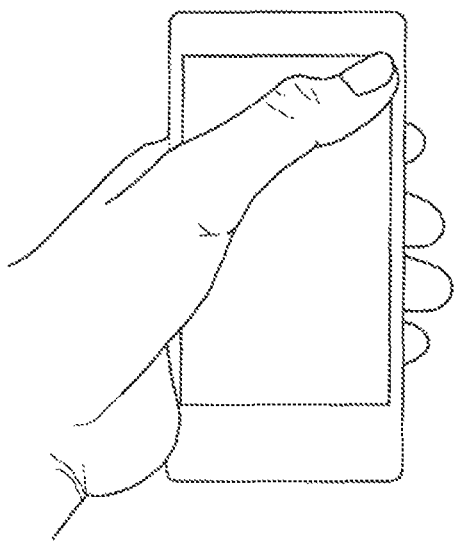
FIG. 26 A diagram showing a state in which the smart phone is held by one hand.

Next, a situation that occurs in the case where the smart phone is held by one hand (Part II) will be considered. FIG. 26 is a diagram showing a state in which the smart phone is held by one hand. A difference of the holding method shown in this figure from the holding method shown in the previous figure is that the holding is achieved such that the degree of freedom of the thumb used for the screen operation is increased. In this state, the tips of the index to little fingers are not located at positions touching the touch screen.

In the case of the figure, the situation of the information processing apparatus 99 is a situation where the user is holding the information processing apparatus 99 or performing a screen operation. The touch operation that should be detected in this situation is selection of the selection targets D by the tip of the thumb in the case of the screen operation. The touch operation that should be detected in this situation is not present in the case of holding. The false detection occurs by the base of the thumb touching the touch screen.

Figure 27:
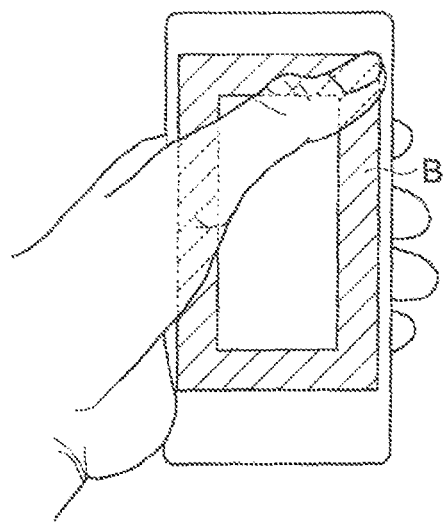
FIG. 27 A diagram showing an example in which an input-ignoring region B is provided in the smart phone.

In such a case, in the information processing apparatus 1, the false detection rate can be reduced by using be first limit mode or the second limit mode. FIG. 27 is an example in which the CPU 6 provides, in using the first limit mode, an input-ignoring region B in the entire outer peripheral portion of the touch screen 2.

(Case where Smart Phone is Held by One Hand (Part III))

Figure 28:
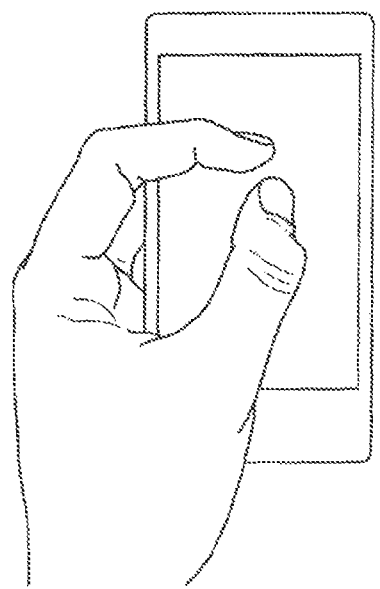
FIG. 28 A diagram showing a state in which the smart phone is held by one hand.

Next, a situation that occurs in the case where the smart phone is held by one hand (Part III) will be considered. FIG. 28 is a diagram showing a state in which the smart phone is held by one hand. A difference of the holding method shown in this figure from the holding method shown in the previous figure is that the index finger is used in addition to the thumb as the fingers used for the screen operation.

In the case of the figure, the situation of the information processing apparatus 99 is a situation where the user is holding the information processing apparatus 99 or performing a screen operation. The touch operation that should be detected in this situation is pinch-in or pinch-out by the tips of the thumb and index finger in the case of the screen operation. The touch operation that should be detected in this situation is not particularly present in the case of holding. The false detection occurs by the base of the thumb or the index finger touching the touch screen.

Figure 29:
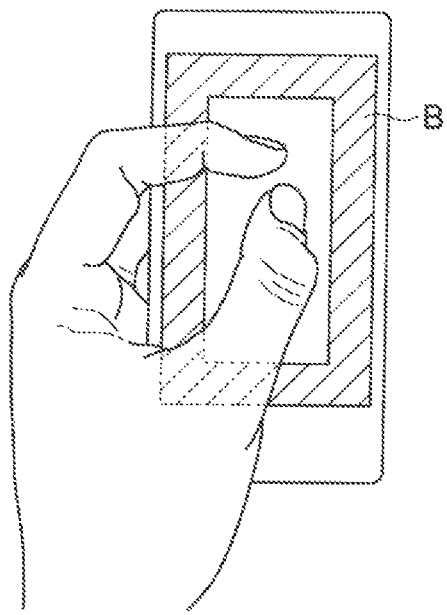
FIG. 29 A diagram showing an example in which an input-ignoring region B is provided in the smart phone.

In such a case, in the information processing apparatus 1, the false detection rate can be reduced by using the first limit mode or the second limit mode. FIG. 29 is an example in which the CPU 6 provides, in using the first limit mode, an input-ignoring region B in the entire outer peripheral portion of the touch screen 2.

Case where Smart Phone is Held by One Hand (Part IV))

Figure 30:
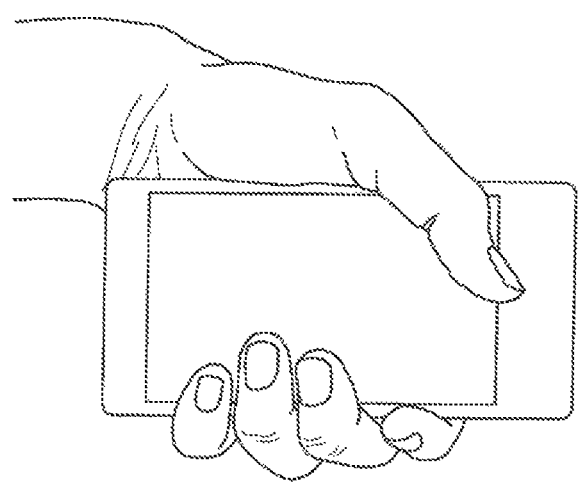
FIG. 30 A diagram showing a state in which the smart phone is held by one hand.

Next, a situation that occurs in the case where the smart phone is held by one hand (Part IV) will be considered. FIG. 30 is a diagram showing a state in which the smart phone is held by one hand. A difference of the holding method shown in this figure from the holding method shown in the previous figure is that the smart phone is gripped by all the fingers grips for securely holding the smart phone not to fall.

In the case of the figure, the situation of the information processing apparatus 99 is a situation where the user is carrying the information processing apparatus 99. The touch operation that should be detected in this situation is not present. The false detection occurs by the tips of all the fingers touching the touch screen.

Figure 31:
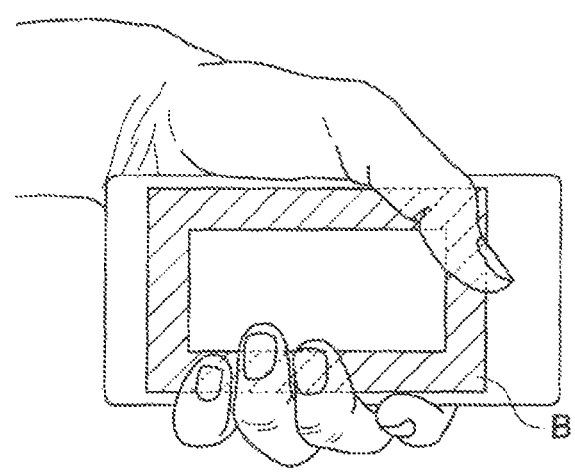
FIG. 31 A diagram showing an example in which an input-ignoring region B is provided in the smart phone.

In such a case, in the information processing apparatus 1, the false detection rate can be reduced by using the first limit mode. FIG. 31 is an example in which the CPU 6 provides, in using the first limit mode, an input-ignoring region B in the entire outer peripheral portion of the touch screen 2.

Hereinabove, the various types of false detection in the case where the user holds the smart phone and the countermeasure patterns therefor have been shown together. In conclusion, the smart phone is small, and hence held by the user in various methods. Therefore, it can be said that it is difficult to further reduce the range of the input-ignoring region B from the outer peripheral portion of the touch screen 2 depending on the smart phone-holding attitude. Thus, in the above-mentioned example, in the case of holding the smart phone, the input-ignoring region B is provided in the outer peripheral portion of the touch screen 2 irrespective of the holding situation.

Hereinabove, the countermeasures effective for reducing the false detection rate depending on the size of the information processing apparatus 1 (large tablet, small tablet, smart phone) and each use situation (holding by both hands, holding by one hand, carrying) have been shown. From the analysis for each of these situations, it can be understood that the first limit mode is effective in all the situations where the information processing apparatus 1 is used and the second limit mode is also effective in some cases.

That is, by applying the first limit mode at a time when it is analyzed that the GUI of the information processing apparatus 1 does not use the entire screen, it is possible to obtain the above-mentioned effects in the present technology.

By the CPU 6 using the attitude sensor 10 to detect that the information processing apparatus 1 is in a state in which it is suitable to apply the second limit mode and applying the second limit mode in addition to the first limit mode, the false detection rate can be further reduced.

Although the transition from the normal mode to the limit mode is performed after the analysis of the screen in the above-mentioned embodiment, it is not limited thereto. A configuration in which the CPU 6 detects, based on the output of the attitude sensor 10, that it is suitable to put the information processing apparatus 1 on the limit mode in that situation and performs a transition from the normal mode to the limit mode may be employed.

Modified Example 2

Next, a modified example of the information processing apparatus 1 using the present technology will be described. Here, a configuration in which the touch screen 2 extends to an outer peripheral portion of a casing of the information processing apparatus 1 will be considered. That is, corresponding to the display panel 4, the touch screen 2 is constituted of a region in which coordinates designated by the user are detected and an extended region in which a position at which the information processing apparatus 1 is held by the user is detected. By extending the detection region of the touch screen 2 to the outer peripheral portion of the information processing apparatus 1 beyond the range of the display panel 4, the touch screen 2 can be used to detect the positions of the fingers of the user holding the information processing apparatus 1.

By detecting the positions of the fingers of the user holding the information processing apparatus 1, it is possible to determine, in more specific manner than in the case of using the attitude sensor 10, the holding state of the information processing apparatus 1 and positions on the display panel 4 where the false detection is likely to occur when the finger touches them.

By determining the positions of the fingers holding the information processing apparatus 1 in the specific manner, it is possible to set the input-ignoring region B to a further limited range. Further limiting the input-ignoring region B means extending the range used by the user for input operations and means that the user can perform the input operations more smoothly and naturally.

Note that a configuration in which the output of the attitude sensor 10 is also used in addition to the finger detection in the outer peripheral portion of the information processing apparatus 1 may be employed. In the configuration in which the output of the attitude sensor 10 is also used, it is possible to more accurately determine the holding state of the information processing apparatus 1.

Although the configuration in which the touch screen 2 is extended to the outer peripheral portion of the information processing apparatus 1 has been shown, it is not limited thereto. A configuration in which a sensor for detecting the positions of the fingers holding the information processing apparatus 1 (second sensor, for example, pressure sensor, thermal sensor) is additionally provided in the outer peripheral portion of the information processing apparatus 1 may be employed.

Figure 32:
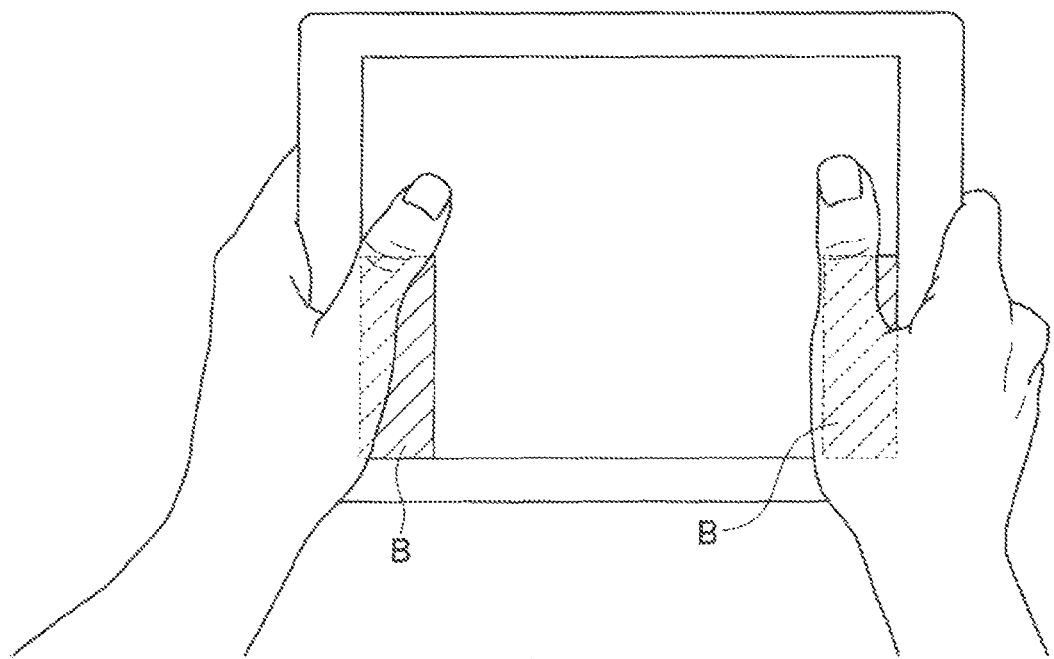
FIG. 32 A diagram showing a setting example of the input-ignoring region(s) B in the case where the large tablet is held by both hands, using the configuration of the modified example.

FIG. 32 is a diagram showing a setting example of the input-ignoring region(s) B is the case where the large tablet is held by both hands, using the configuration of the modified example. In comparison with the case of using only the output of the attitude sensor 10, the input-ignoring region B in a lower center portion is removed.

Figure 33:
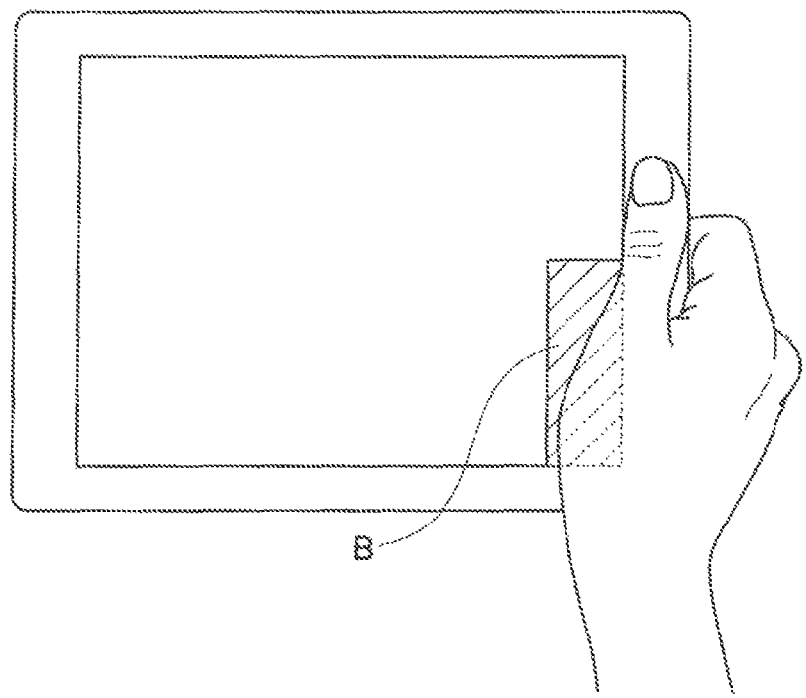
FIG. 33 A diagram showing a setting example of the input-ignoring region(s) B in the case where the large tablet is held by the right hand, using the configuration of the modified example.

FIG. 33 is a diagram showing a setting example of the input-ignoring region(s) B in the case where the large tablet is held by the right hand, using the configuration of the modified example. In comparison with the case of holding by both hands, the input-ignoring region B on the left side is removed.

Figure 34:
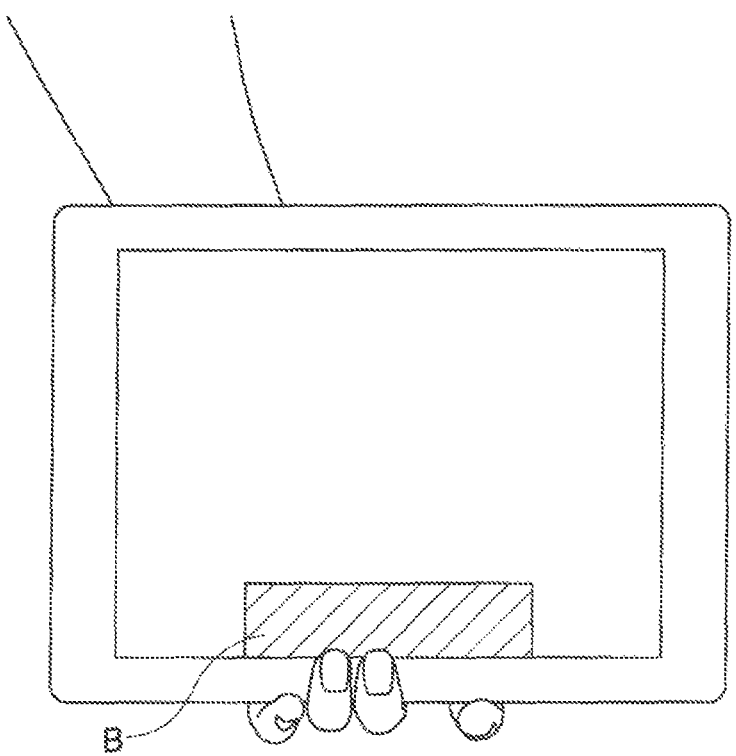
FIG. 34 A diagram showing a setting example of the input-ignoring region(s) B in the case where the large tablet is held by the left hand, using the configuration of the modified example.

FIG. 34 is a diagram showing a setting example of the input-ignoring region(s) B in the case where the large tablet is held by the left hand, using the configuration of the modified example. In the case where of using only the output of the attitude sensor 10, the input-ignoring region B is limited to the lower center portion.

Figure 35:
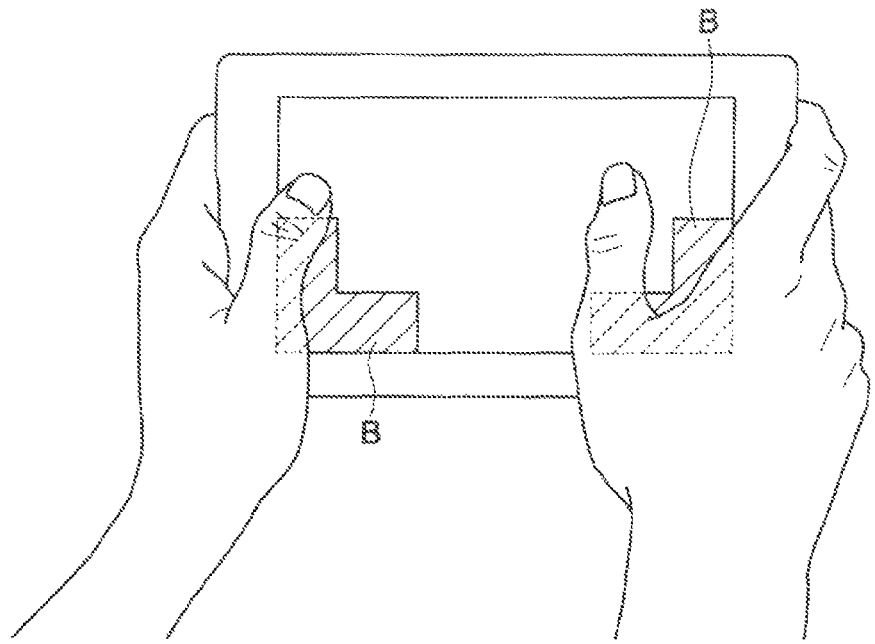
FIG. 35 A diagram showing a setting example of the input-ignoring region(s) B in the case where the small tablet is held by both hands, rising the configuration of the modified example.

FIG. 35 is a diagram showing a setting example of the input-ignoring region(s) B in the case where the small tablet is held by both hands, using the configuration of the modified example. In the case where of using only the output of the attitude sensor 10, the input-ignoring region B in the lower center portion is removed.

Figure 36:
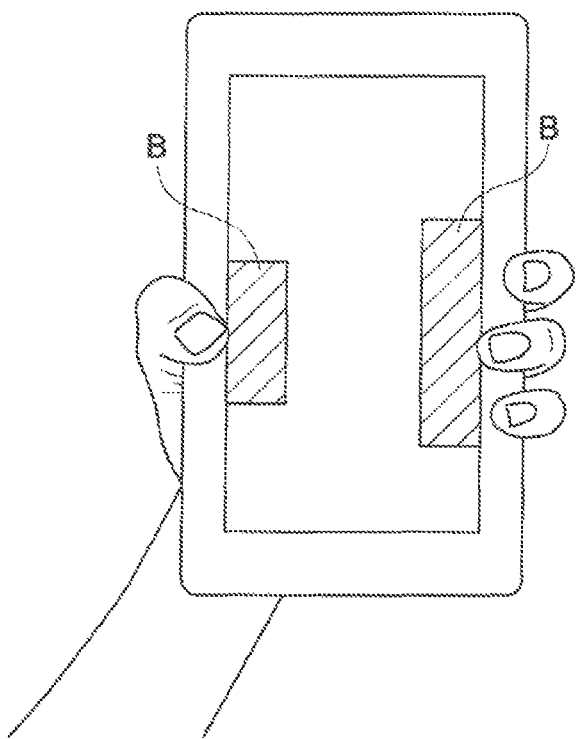
FIG. 36 A diagram showing a setting example of the input-ignoring region(s) B in the case where the small tablet is held by the left hand from behind, using the configuration of the modified example.

FIG. 36 is a diagram showing a setting example of the input-ignoring region(s) B in the case where the small tablet is held by the left hand from behind, using the configuration of the modified example. In the case where of using only the output of the attitude sensor 10, the input-ignoring regions B on both the left and right sides are further limited.

Figure 37:
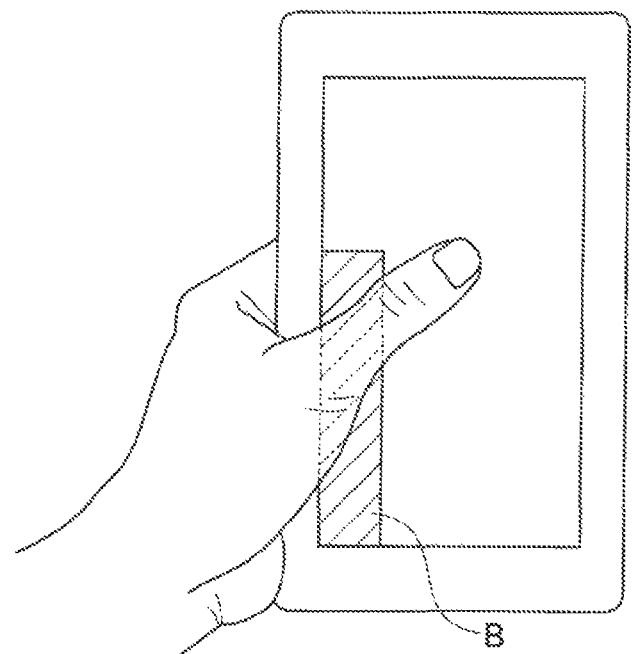
FIG. 37 A diagram showing a setting example of the input-ignoring region(s) B in the case where the small tablet is held by the left hand from the left side, using the configuration of the modified example.

FIG. 37 is a diagram showing a setting example of the input-ignoring region(s) B in the case where the small tablet is held by the left hand from the left side, using the configuration of the modified example. In comparison with the case of holding the left hand from behind, the input-ignoring region B on the right side is removed.

Figure 38:
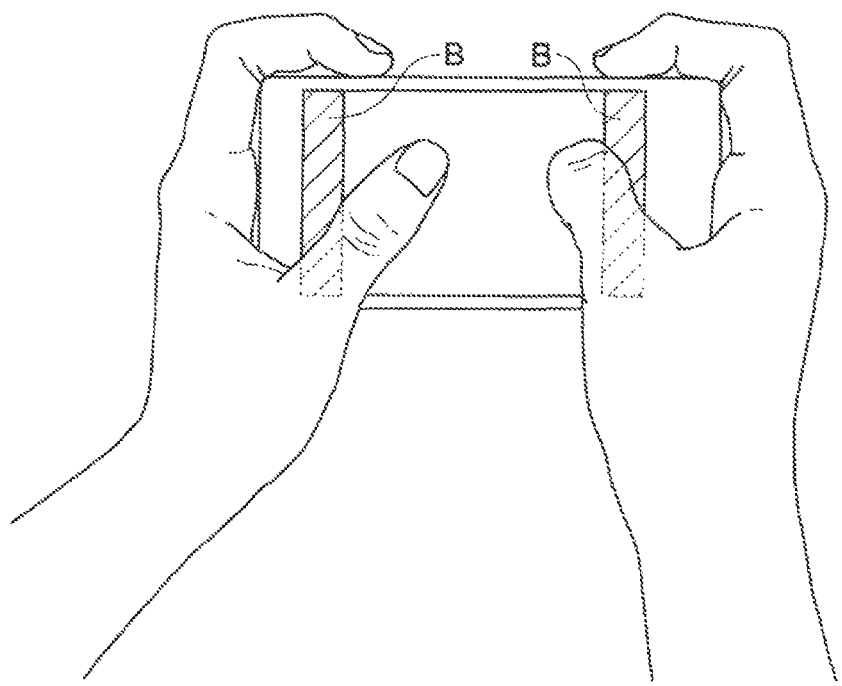
FIG. 38 A diagram showing a setting example of the input-ignoring region(s) B in the case where the smart phone is held by both hands, using the configuration of the modified example.

FIG. 38 is a diagram showing a setting example of the input-ignoring region(s) B in the case where the smart phone is held by both hands, using the configuration of the modified example. In the case where of using only the output of the attitude sensor 10, the input-ignoring regions B in the upper and lower center portions are removed.

Figure 39:
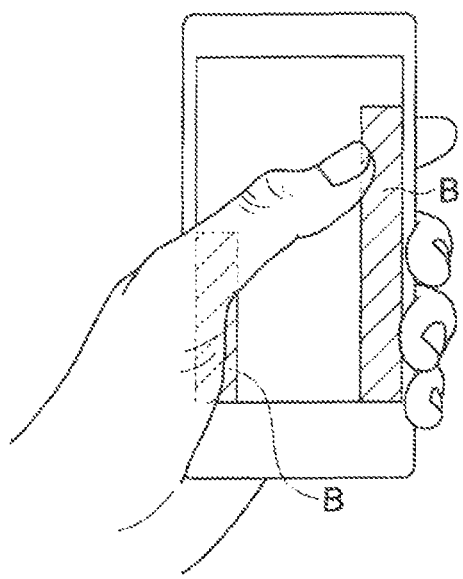
FIG. 39 A diagram showing a setting example of the input-ignoring region(s) B in the case where the smart phone is held by the left hand, using the configuration of the modified example.

FIG. 39 is a diagram showing a setting example of the input-ignoring region(s) B in the case where the smart phone is held by the left hand, using the configuration of the modified example. In the case where of using only the output of the attitude sensor 10, the input-ignoring regions B in the upper and lower center portions are removed and the input-ignoring regions B on both the left and right sides are limited.

Figure 40:
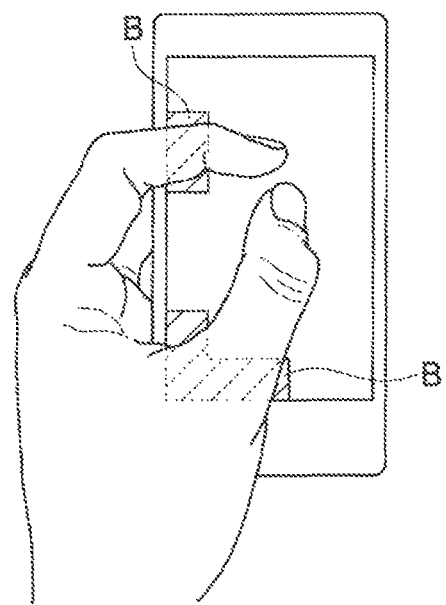
FIG. 40 A diagram showing a setting example of the input-ignoring region(s) B in the case where a pinch operation is performed on the smart phone by the left hand, using the configuration of the modified example.

FIG. 40 is a diagram showing a setting example of the input-ignoring region(s) B in the case where a pinch operation is performed on the smart phone by the left hand, using the configuration of the modified example. In the case where of using only the output of the attitude sensor 10, the input-ignoring regions B are limited to very small ranges.

Figure 41:
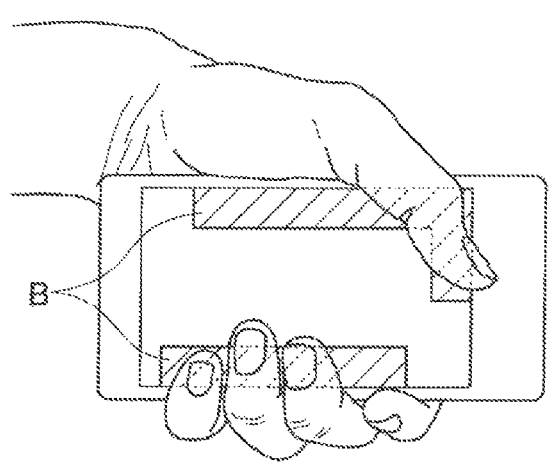
FIG. 41 A diagram showing a setting example of the input-ignoring region(s) B in the case where the smart phone is carried by the left hand, using the configuration of the modified example.

FIG. 41 is a diagram showing a setting example of the input-ignoring region(s) B in the case where the smart phone is carried by the left hand, using the configuration of the modified example. In the case where of using only the output of the attitude sensor 10, the input-ignoring regions B are limited.

Supplemental Matters

The present technology is not limited only to the above-mentioned embodiments and various changes can be made without departing from the gist of the present technology as a matter of course.

Other Configurations of Present Technology

Note that the present technology may also take the following configurations.
(1) An information processing apparatus, including:
  a display panel;
  a sensor panel that is superimposed on the display panel and detects coordinates designated by a user; and
  a control unit that sets, with a region detectable by the sensor panel being a first region, a second region in at least a part of the first region and invalidates the coordinates detected in the second region.
(2) The information processing apparatus according to (1), in which
  the control unit analyzes information on a screen displayed on the display panel and sets the second region if the analysis result satisfies a predetermined condition.
(3) The information processing apparatus according to (1) or (2), in which
  the control unit provides the second region in an outer peripheral portion of the first region.
(4) The information processing apparatus according to any one of (1) to (3), further including
  a first sensor that detects an attitude of holding the information processing apparatus, in which
  the control unit sets the second region based on the detected attitude.
(5) The information processing apparatus according to (4), in which
  the display panel has different vertical and horizontal lengths, and
  the control unit
  sets, when the display panel is held in a vertically long attitude, the second region on both sides in a direction orthogonal to a longitudinal direction of the first region, and
  sets, when the display panel is held in a horizontally long attitude, the second region on both sides in the longitudinal direction of the first region and a lower side of the first region in this attitude.
(6) The information processing apparatus according to any one of (1) to (5), in which
  the control unit displays, when the second region is set, information of the screen in a region inside the second region.
(7) The information processing apparatus according to any one of (1) to (6), further including
  a second sensor that detects a holding position at which the user holds the information processing apparatus, in which
  the control unit sets the second region based on the detected holding position.
(8) The information processing apparatus according to (7), in which
  the sensor panel is constituted of a region corresponding to the display panel, in which coordinates designated by a user are detected, and a region that functions a second sensor that detects a finger position of a user holding the information processing apparatus.
(9) The information processing apparatus according to (1) or (2), in which
  the control unit
  determines a third region which is displayed in at least a part of the first region, to which predetermined processing is assigned, and which is selectable by a user, and
  sets a region of the first region, which excludes the third region, as the second region.
(10) The information processing apparatus according to (9), in which
  the third region is an icon.
(11) The information processing apparatus according to (9), in which
  the third region is an input section of a graphical user interface.
(12) An information processing method, including: by a control unit
  setting, with a region detectable by a sensor panel that is superimposed on a display panel and detects coordinates designated by a user being a first region, a second region in at least a part of the first region; and
  invalidating the coordinates detected in the second region.

DESCRIPTION OF SYMBOLS 1 information processing apparatus
2 touch screen
3 processor
4 display panel
5 driver
6 CPU
7 ROM
8 RAM
9 back-up memory
10 attitude sensor
11 bus 20 input unit
30 display unit
99 information processing apparatus
A region in which there is possibility that false detection may occur
B input-ignoring region
C input enabled region
D selection target
E input enabled region
F input-ignoring region

The invention claimed is:

1. An information processing apparatus, comprising:
a display panel with a first surface area;
a sensor panel with a second surface area larger than the first surface area,
  wherein the sensor panel is superimposed on the display panel, and
  wherein the sensor panel is configured to detect user-designated coordinates on the second surface area; and
a control unit configured to:
  set a region detectable by the sensor panel as a first region;
  analyze first information displayed on a screen of the display panel to determine an input enabled region of the displayed first information,
    wherein the input enabled region is used to input user operation;
  set a second region in at least a part of the first region, based on the input enabled region of the displayed first information;
  invalidate the user-designated coordinates detected in the second region; and
  control the screen to further display second information in a region inside the second region based on the set second region.

2. The information processing apparatus according to claim 1,
wherein the control unit is further configured to set the second region in an outer peripheral portion of the first region.

3. The information processing apparatus according to claim 1, further comprising:
a first sensor configured to detect an attitude at which the information processing apparatus is held,
wherein the control unit is further configured to set the second region based on the detected attitude.

4. The information processing apparatus according to claim 1, wherein the display panel has different vertical length and horizontal length, and
the control unit is further configured to:
  set the second region on both sides in a direction orthogonal to a longitudinal direction of the first region based on the display panel held in a vertically long attitude; and
  set the second region on both sides in the longitudinal direction of the first region and a lower side of the first region based on the display panel held in a horizontally long attitude.

5. The information processing apparatus according to claim 1, further comprising:
a second sensor configured to detect a holding position at which the information processing apparatus is held,
wherein
the control unit is further configured to set the second region based on the detected holding position.

6. The information processing apparatus according to claim 5, wherein the sensor panel comprises:
the first region corresponding to the first surface area of the display panel, wherein the user designated coordinates are detected in the first region; and
a third region corresponding to the second surface area that is beyond the first surface area,
wherein the sensor panel is further configured to detect a finger position of a user in the third region, and
wherein the user holds the information processing apparatus.

7. The information processing apparatus according to claim 1,
wherein the control unit is further configured to:
determine, based on a coordinate position of at least a selection target, a fourth region which is displayed in at least a first part of the first region, wherein the fourth region is selectable by a user; and
set a second part of the first region, as the second region, wherein the second part of the first region is different from the first part of the first region.

8. The information processing apparatus according to claim 7,
wherein the selection target is an icon.

9. The information processing apparatus according to claim 7,
wherein the fourth region is an input section of a graphical user interface.

10. An information processing method, comprising:
in a control unit:
setting a region detectable by a sensor panel superimposed on a display panel as a first region,
  wherein the display panel has a first surface area and the sensor panel has a second surface area larger than the first surface area,
  and
  wherein the sensor panel is configured to detect user-designated coordinates;
analyzing first information displayed on a screen of the display panel to determine an input enabled region of the displayed first information,
  wherein the input enabled region is used to input user operation;
setting a second region in at least a part of the first region, based on the input enabled region of the displayed first information;
invalidating the user-designated coordinates detected in the second region; and
controlling the screen to further display second information in a region inside the second region based on the set second region.

* * * * *